US011836266B2

(12) United States Patent
Levay et al.

(10) Patent No.: US 11,836,266 B2
(45) Date of Patent: Dec. 5, 2023

(54) CLOUD-BASED METHODS AND SYSTEMS FOR INTEGRATED OPTICAL CHARACTER RECOGNITION AND REDACTION

(71) Applicant: Redactable Inc., New York, NY (US)

(72) Inventors: Amanda Levay, New York, NY (US); Aleksandr Grinevskii, Bali (ID)

(73) Assignee: REDACTABLE INC., New York, NY (US)

( * ) Notice: Subject to any disclaimer, the term of this patent is extended or adjusted under 35 U.S.C. 154(b) by 0 days.

(21) Appl. No.: 18/081,539

(22) Filed: Dec. 14, 2022

(65) Prior Publication Data

US 2023/0281330 A1 Sep. 7, 2023

Related U.S. Application Data

(60) Provisional application No. 63/289,589, filed on Dec. 14, 2021.

(51) Int. Cl.
| | |
|---|---|
| *G06F 21/62* | (2013.01) |
| *G06V 10/94* | (2022.01) |
| *G06V 30/416* | (2022.01) |
| *G06V 30/146* | (2022.01) |
| *G06V 30/42* | (2022.01) |
| *G06V 30/148* | (2022.01) |
| *G06V 10/96* | (2022.01) |
| *G06V 30/16* | (2022.01) |

(52) U.S. Cl.
CPC ......... *G06F 21/6218* (2013.01); *G06V 10/95* (2022.01); *G06V 10/96* (2022.01); *G06V 30/1463* (2022.01); *G06V 30/153* (2022.01); *G06V 30/16* (2022.01); *G06V 30/416* (2022.01); *G06V 30/42* (2022.01)

(58) Field of Classification Search
CPC .. G06F 3/04845; G06F 40/151; G06F 40/166; G06F 21/6218; G06V 10/96; G06V 30/1463; G06V 30/153; G06V 30/16; G06V 30/416; G06V 10/95; G06V 30/42
See application file for complete search history.

(56) References Cited

U.S. PATENT DOCUMENTS

| | | | |
|---|---|---|---|
| 9,276,939 B2 * | 3/2016 | Bittner | G06F 40/20 |
| 10,037,689 B2 * | 7/2018 | Taylor | G05D 1/0285 |

(Continued)

OTHER PUBLICATIONS

International Search Report and Written Opinion for International Application No. PCT/US2022/052891; dated Mar. 16, 2023; 11 pages.

*Primary Examiner* — Gary S Gracia
(74) *Attorney, Agent, or Firm* — Perkins Coie LLP

(57) ABSTRACT

Systems and methods provide a deployable cloud-agnostic redaction container for performing optical character recognition and redacting information from a document using a cloud-based, guided redaction framework. An example method for document redaction includes receiving a plurality of documents and extracting pages from the plurality of documents. The method then determines, based on a load balancing criterion, a processing order for the pages extracted from the plurality of documents, and performs, based on the processing order, an optical character recognition process and a redaction process on the pages to generate redacted pages. The redacted pages are provided for transmission or storage to a cloud data management platform.

15 Claims, 21 Drawing Sheets

(56) References Cited

U.S. PATENT DOCUMENTS

| | | | | |
|---|---|---|---|---|
| 10,108,742 | B1* | 10/2018 | Sun | G06F 21/60 |
| 10,354,233 | B2* | 7/2019 | Murphy | G06Q 20/401 |
| 10,824,894 | B2* | 11/2020 | Palmer | G06F 16/93 |
| 10,853,570 | B2* | 12/2020 | Matichuk | G06F 40/253 |
| 11,144,669 | B1* | 10/2021 | Rao | G06F 16/3346 |
| 11,641,404 | B1* | 5/2023 | Szczepański | H04L 67/1396 709/204 |
| 2002/0083079 | A1* | 6/2002 | Meier | G06F 16/93 |
| 2006/0117318 | A1* | 6/2006 | Rumelhart | G06F 9/505 718/104 |
| 2014/0047234 | A1* | 2/2014 | Davis | G06Q 10/10 713/160 |
| 2014/0082523 | A1* | 3/2014 | Duquene | G06F 16/176 715/753 |
| 2015/0071542 | A1* | 3/2015 | Dahl | G06V 30/226 382/177 |
| 2015/0220539 | A1* | 8/2015 | Lambert | G06F 16/355 707/723 |
| 2016/0307063 | A1* | 10/2016 | Bright | G06V 30/153 |
| 2017/0132186 | A1* | 5/2017 | Plummer | G06F 21/6218 |
| 2017/0147828 | A1* | 5/2017 | Kurian | G06F 21/604 |
| 2018/0260734 | A1* | 9/2018 | Beveridge | G06N 20/00 |
| 2018/0322106 | A1* | 11/2018 | Roks | H04L 67/06 |
| 2019/0138747 | A1* | 5/2019 | Anderson | G06F 21/6254 |
| 2019/0188400 | A1* | 6/2019 | Vandervort | G06F 21/6209 |
| 2020/0110902 | A1* | 4/2020 | Zakour | G06F 16/22 |
| 2020/0151246 | A1* | 5/2020 | Mwarabu | G06F 18/214 |
| 2020/0293685 | A1* | 9/2020 | Levay | G06F 16/258 |
| 2020/0320167 | A1* | 10/2020 | Mane | G06F 40/40 |
| 2020/0327817 | A1* | 10/2020 | Raynaud | G09B 5/06 |
| 2021/0194888 | A1* | 6/2021 | Bhaskar S | H04L 63/105 |
| 2022/0224540 | A1* | 7/2022 | Chaudhry | G06F 21/64 |

* cited by examiner

FIG. 16

```
DriveController.cs  X | ej.spreadsheet.min.js | redact.component.ts | test-multi-query-external.js | redact.component.html
Redactable.API      ▶ | Redactable.API.Controllers.DriveController    ▶ | DownloadFileForRedaction(DriveItemDto driveItemD 1115    /// <param name="id">File id</param>
1116    /// <param name="chunk">chunk</param>
1117    /// <returns>File content result </returns>
1118    [HttpPost("downloadFileForRedaction")]
1119    [Produces ResponseType(404)]
        0 references | 0 requests | 0 exceptions
1120    public async Task<IActionResult> DownloadFileForRedaction([FromBody] DriveItemDto driveItemDto)
1121    {
1122        try
1123        {
1124            _logger.LogInformation("DownloadFile Method called *");
1125
1126            DriveItem driveItem =
1127            await _driveItemRepository.FirstOrDefaultAsync(_ =>
1128                !_.IsDeleted && _.CreatorUserId == UserSession.UsewrID && _.Id == driveItemDto.Id.Decrypt() && _.Type == DriveItem
1129
1130            if (driveItem == null)
1131                return NotFound();
1132            driveItem.OpenedTime = DateTime.UtcNow;
1133            driveItem.Downloaded = true;
1134            await _driveItemRepository.UpdateAsync(driveItem);
1135            byte[] data = await _driveService.DownloadFileAsync1(driveItem, UserSession.UserId, null);
1136 ⌀    ▬   if (data [| == null)
1137            {
1138                return NotFound();
1139            Response.Headers.Add("Access-Control-Expose-Headers", "Content-Disposition, Number-Of-Pages");
1140            Response.Headers.Add("Number-Of-Pages", driveItem.NumberOfPages.ToString());
1141            var pathToSave = Path.Combine(Directory.GetCurrentDirector(), @"StaticFiles\" + Regex.Replace(Convert.ToString(driveItem
1142                Z.]+", "*") + @"*\*" + Regex.Replace(driveItem.FileName, @"*[^0-9a-zA-Z.]+", ""));
1143            if (directory.Exists"
1144                directory.Delete(true);
1145            CreateDirectory)data, pathToSave, directory);

75 %  ▶    ⊘ No issues found
```

```
function onNewHighlights(id, data, defaultState) {
  if (localStorage.getItem("firstHighlightClicked") == undefined) {
    data.jumpToFirstHighlightedHit = false;
    localStorage.setItem("firstHighlightClicked", "1");
  }
  // fixme works but still need to force page refresh
  allKeywords[id] = data;
  allKeywords[id]["check123"] = id;
  if (data.matches != undefined) {
    for (var i = 0; i < data.matches.length; i++) {
      var index = lastClickedHit.findIndex(function (x) { return x.page == data.matches[i].page && x.area[0] == data.matches[i].area[0]
        && data.matches[i].area[1] && x.area[2] == data.matches[i].area[2] && x.area[3] == data.matches[i].area[3]; });
      if (index != undefined && index != -1 && index != null)
        lastClickedHit.splice(index, 1);
      lastClickedHit.push(data.matches[i]);
    }
    lastClickedHit.concat(data.matches);
    localStorage.setItem("totalMatch", lastClickedHit.length.toString());
    updateHitsState(data.matches, defaultState || STATE_FOUND, id);
    updatePdfHighlights();
    // localStorage.setItem("hideSpinner", "1");
  }
}
```

FIG. 17

```
var STATE_PROPS = {
    0: {
        state: STATE_FOUND,
        color: [1, 1, 0]
    },
    1: {
        state: STATE_REDACTED,
        color: [0, 0, 0]
    },
    2: {
        state: STATE_SKIP,
        color: [1, 1, 0.9]
    }
};
```

FIG. 18

```
var documentState = {
    driveItemId: 2,
    action: {
        pageNumber: lastClickedHit[i].page,
        selection: selectionData
    },
    actionType: 'manualRedact',
    actionPerformed: 'redactAllHit',
    finalStatus: 'permanent',
    redactIndex: redactIndex
};
if (localStorage.getItem("DocumentState") ! = undefined)
```

FIG. 19

```
var redactIndex;
if (list.length > 0) {
    for (var i = list.length - 1; i > -1; i--) {
        if (list[i].finalStatus == "permanent") {
            lastActionPerformed = list[i].actionPerformed;
            if (list[i].action != undefined && list[i].actionPerformed != 'redactAllHit') {
                var j = lastClickedHit.findIndex(function (x) { return x.page == list[i].action.pageNumber && (x.area[2] - x.area[0]) == list
                    [i].action.selection.rect.x && (x.area[3] - x.area[1]) == list[i].action.selection.rect.y && x.area[0] == list
                    [i].action.selection.rect.rectWidth && x.area[2] == list[i].action.selection.rect.rectHeight && (x.match == undefined || list
                    [i].action.selection.selectedText == x.match); });
                if (j != undefined && j != null && j != -1) {
                    index TuUndo = j;
                    redactIndex = list[1].redactIndex;
                    indexToUndoForDocumentStateList = i;
                    break;
                }
                else {
                    indexToUndo = i;
                    redactIndex = list[i].redactIndex;
                    indexToUndoForDocumentStateList = i;
                    break;
                }
                break;
                //lastActionPerformed = list[i].actionPerformed;
                //indexToUndo = i;
                //redactIndex = list[i].redactIndex;
                //break;
            }
        }
    }
}
```

FIG. 20

```
var indexToUndoForDocumentStateLists;
if (list.length > 0) {
    for (var i = 0; i < list.length; i++) {
        if (list[i].finalStatus == "temp") {
            lastAction Performed = list[i].actionPerformed;
            if (list[i].action != undefined && list[i].actionPerformed != 'redactAllHit') {
                var j = lastClickedHit.findIndex(function (x) { return x.page == list[i].action.pageNumber && (x.area[2] - x.area[0]) == list
                    [i].action.selection.rect.x && (x.area[3] - x.area[1]) == list[i].action.selection.rect.y && x.area[0] == list
                    [i].action.selection.rect.rectWidth && x.area[2] == list[i].action.selection.rect.rectHeight && (x.match == undefined || list
                    [i].action.selection.selectedText == x.match); });
                if (j != undefined && j != null && j != -1) {
                    index ToUndo = j;
                    redactIndex = list[1].redactIndex;
                    indexToUndoForDocumentStateList = i;
                    break;
                }
            }
            else {
                indexToUndo = i;
                redactIndex = list[i].redactIndex;
                indexToUndoForDocumentStateList = i;
                break;
            }
            break;
            //lastActionPerformed = list[i].actionPerformed;
            //indexToUndo = i;
            //redactIndex = list[i].redactIndex;
            //break;
        }
    }
}
```

FIG. 21

CLOUD-BASED METHODS AND SYSTEMS FOR INTEGRATED OPTICAL CHARACTER RECOGNITION AND REDACTION

CROSS REFERENCE TO RELATED APPLICATIONS

This application claims priority to U.S. Provisional Application 63/289,589 filed on Dec. 14, 2021, the disclosure of which is hereby incorporated by reference herein in its entirety.

TECHNICAL FIELD

The disclosure generally relates to cloud-based services, and more specifically, to systems and methods for redacting information from documents using a cloud-based, guided redaction framework.

BACKGROUND

Redaction (also known as sanitization) is the obscuring or removal of information in a document. The information can include, but is not limited to, text, images and video. The process of redaction is intended to allow the selective disclosure of certain content in a document while keeping other content in the document undisclosed. Typically, the result is a document that is suitable for publication or for dissemination to others rather than the intended audience of the original document.

SUMMARY

The present disclosure provides systems and methods for a deployable cloud-agnostic redaction container that enables redacting information from a document using a cloud-based, guided redaction framework. In an example, this is achieved by creating an optical character recognition (OCR) system that utilizes artificial intelligence and/or machine learning to rebuild images files in real time and transform them into electronic Portable Document Format (PDF) documents that are subsequently redacted using one or more guided redaction frameworks. The described embodiments advantageously enable the simultaneous processing of multiple files from multiple users using a cloud-based parallel processing architecture.

In an example aspect, a system for document redaction is disclosed. The system includes a redaction container that includes a pre-processing module configured to receive a plurality of documents, and identify a subset of documents from the plurality of documents which satisfy one or more selection criterion, a message broker configured to extract pages from each of the subset of documents, a load balancer configured to determine a processing order for the pages extracted from the subset of documents, redaction software configured to perform, on each of the pages extracted from the subset of documents and based on the processing order, an optical character recognition process and a redaction process to generate redacted pages, and a redaction application programming interface configured to provide the redacted pages for transmission or storage to a cloud data management platform.

In another example aspect, a method of document redaction is disclosed. The method includes receiving a plurality of documents and extracting pages from the plurality of documents. The method then determines, based on a load balancing criterion, a processing order for the pages extracted from the plurality of documents, and performs, based on the processing order, an optical character recognition process and a redaction process on the pages to generate redacted pages. The redacted pages are provided for transmission or storage to a cloud data management platform.

In yet another example aspect, an apparatus comprising a memory and a processor implements the above-described method is disclosed.

In yet another example aspect, the method may be embodied as processor-executable code and may be stored on a non-transitory computer-readable program medium.

The above and other aspects and features of the disclosed technology are described in greater detail in the drawings, the description and the claims.

BRIEF DESCRIPTION OF THE DRAWINGS

The accompanying drawings, which are incorporated herein and form a part of the specification, illustrate some, but not the only or exclusive, examples of embodiments and/or features.

FIG. 16-18 illustrate example functionality of finding text in a PDF document.

FIG. 19-21 illustrate example undo action and redo action functionalities.

Figure 1:
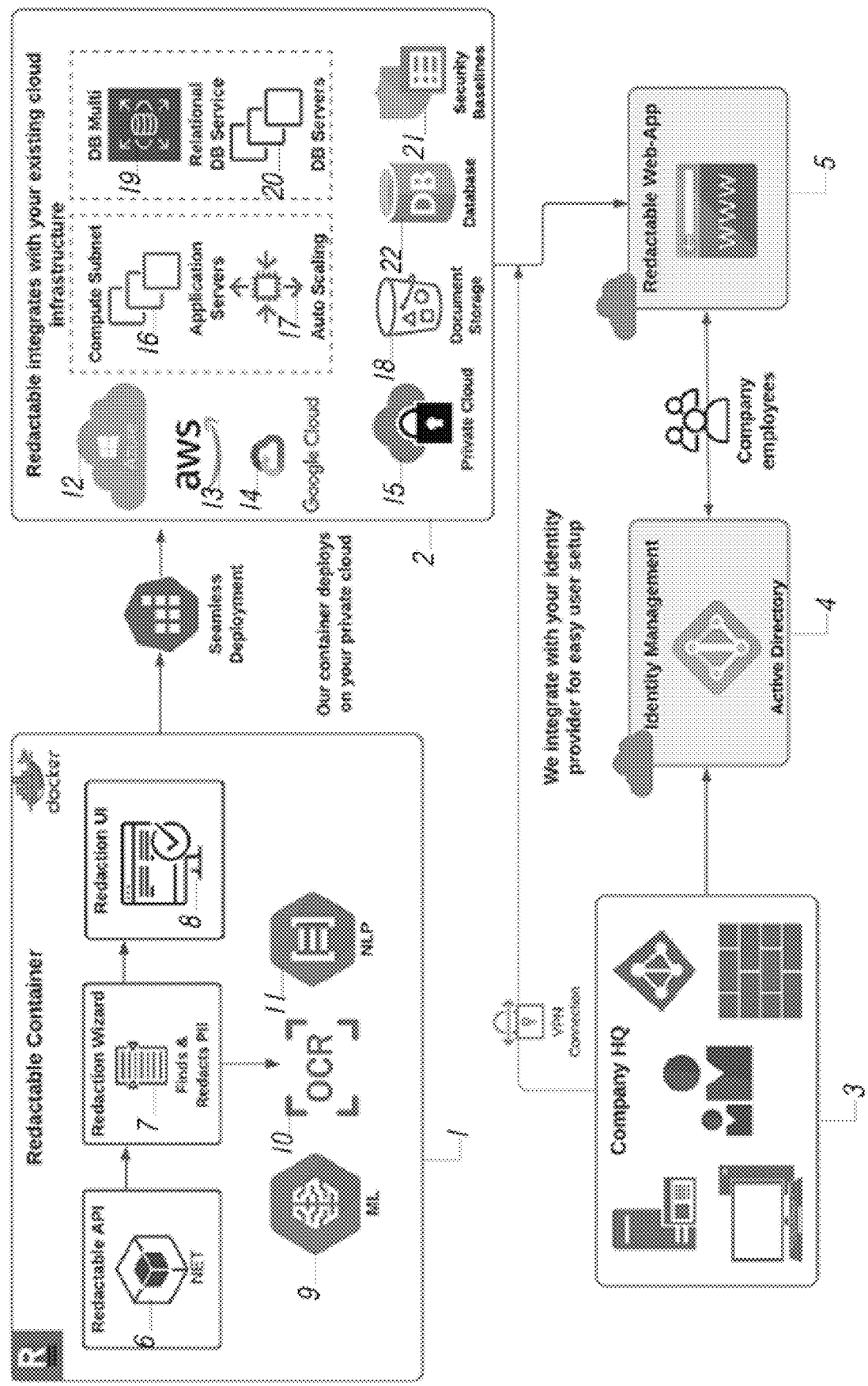
FIG. 1 is a diagram illustrating an example redaction system in deployment to an enterprise client system, showing certain components and functions, interactions, and information and data transfer thereof.

Other aspects shall be more readily understood when considered in conjunction with the accompanying drawings, and the following detailed description, neither of which should be considered limiting.

DETAILED DESCRIPTION

During World War II every letter written by an American soldier overseas was read by a censor. Any stray comments about troop positions or movements, battle plans, military objectives, or anything else that might have been useful to the enemy had to be removed in order to preserve military secrecy. Today, digital documents must be redacted. When redacting content from digital documents, it is not sufficient for security or privacy purposes to simply use an editor to draw a black line or black box over sentences and then save the file. The original content remains with the file and is embedded in the file's 'metadata'. Therefore, anyone with access to the document can copy the data that was redacted, paste it into another document, and read it there instead.

Many forms of digital redaction currently exist. However, they are generally associated with a pre-determined set of file types that are proprietary. The security industry has begun developing 'decentralized' forms of redaction that allow users to perform redaction across file types. In an example, U.S. Patent Application Publication 2009/0019379 discusses a browser-based redaction software program. However, it is not compatible with today's cloud networks. In another example, U.S. Patent Application Publication 2014/0082523 discusses an online redaction program. However, it does not incorporate automatic data string search functionality. In yet another example, U.S. Pat. No. 8,826,443 discusses a browser-based redaction system. However, this system does not function across various cloud network files.

Further, many companies that require redaction services utilize information technology infrastructure that is configured for their own unique needs, and from company-to-company, such needs vary. Accordingly, some companies maintain all documents within a proprietary security framework that precludes the use of browser-based redaction that extends outside the company's intranet, and therefore can use only redaction software that is deployable to the company's information technology environment. Further accordingly, based on each company's unique needs, different companies use different cloud data management platforms as part of the company's information technology environment, and therefore redaction software that is limited to use with one cloud data management platform, or unable to adapt to different cloud data management platforms, cannot be used by certain companies.

Embodiments of the disclosed technology address the aforementioned deficiencies and others, therein providing a large-scale, real-time batch processing architecture in the cloud that can OCR and process queues of documents simultaneously across multiple users and files. In an example, the described embodiments can OCR 1,000+ documents simultaneously in real-time, and 1,000+ users can process 1,000+ documents in real-time as parallel processes. The technical solutions described herein provide a significant improvement over traditional cloud-based batch processing frameworks, which require scheduling and result in multiple users not being able to OCR and redact documents at the same time in real-time.

The example headings for the various sections below are used to facilitate the understanding of the disclosed subject matter and do not limit the scope of the claimed subject matter in any way. Accordingly, one or more features of one example section can be combined with one or more features of another example section.

Example Embodiments of Cloud-Based Document Redaction Systems

FIG. 1 illustrates a diagram that includes an embodiment of the present disclosure, showing certain components and functions, interactions, and information and data transfer thereof in deployment to an enterprise client system (ECS). As shown therein, an entity, such as a company 3 has had deployed to its ECS a redaction container 1 of an embodiment of the present disclosure. The container 1 is comprised of a redaction application programming interface (R-API) 6, a redaction wizard 7 (e.g., which finds and redacts text), and a redaction user interface 8. The redaction wizard also has machine learning 9, optical character recognition (OCR) 10 and natural language processing 11. In an example, machine learning 9 is configured to auto-detect confidential data using pattern matching algorithms, e.g., the format of Social Security Numbers (XXX-XX-XXXX) can be used to automatically redact any SSNs in a document. Alternatively, machine learning 9 can be programmed by the user to auto-detect specific fields or formats. The customized auto-detection can be implemented via programming languages (e.g., C#, F#, Haskell, ML, Python, Ruby, Rust, Scala, Swift, etc.), and using either tree structures or sequences, the latter often being described by regular expressions.

Once the redaction container 1 is deployed and installed into the ECS, the R-API determines which cloud data management platform (CDMP) 2 of a plurality of CDMPs (including but not limited to: Azure 12, Amazon Web Service 13, and Google Cloud 14) is used by the ECS, and then process client data using compatible parameters. In an example, the R-API determines the CDMP that is used by the ECS via user configuration. In another example, the CDMP may provide one or more identifiers when pinged by the R-API, which enables the determination of which CDMP is being used by the ECS. In yet another example, the compatible parameters that are used to process client data include, but are not limited to, authentication parameters (e.g., OAuth 2.0) that are used to issue a token, a user identifier present in the token (e.g., a JSON Web Token (JWT)), and/or API endpoints (e.g., operating in JSON format and made accessible through Swagger UI).

The deployment and installation of the redaction container 1 into the ECS enables the R-API to integrate with the functions of the CDMP of the ECS, including but not limited to document storage 18, databases 22, security baselines 21, application servers 16, autoscaling 17, database multi- and relational services 19, and conventional database server tasks 20. Businesses interact with the CDMP 2 in a conventional manner with a company infrastructure 3 (e.g., employee desktop computers, local area networks and security firewalls), identity management (with Active Directory for example) services 4, and a redaction web app 5.

Figure 2:
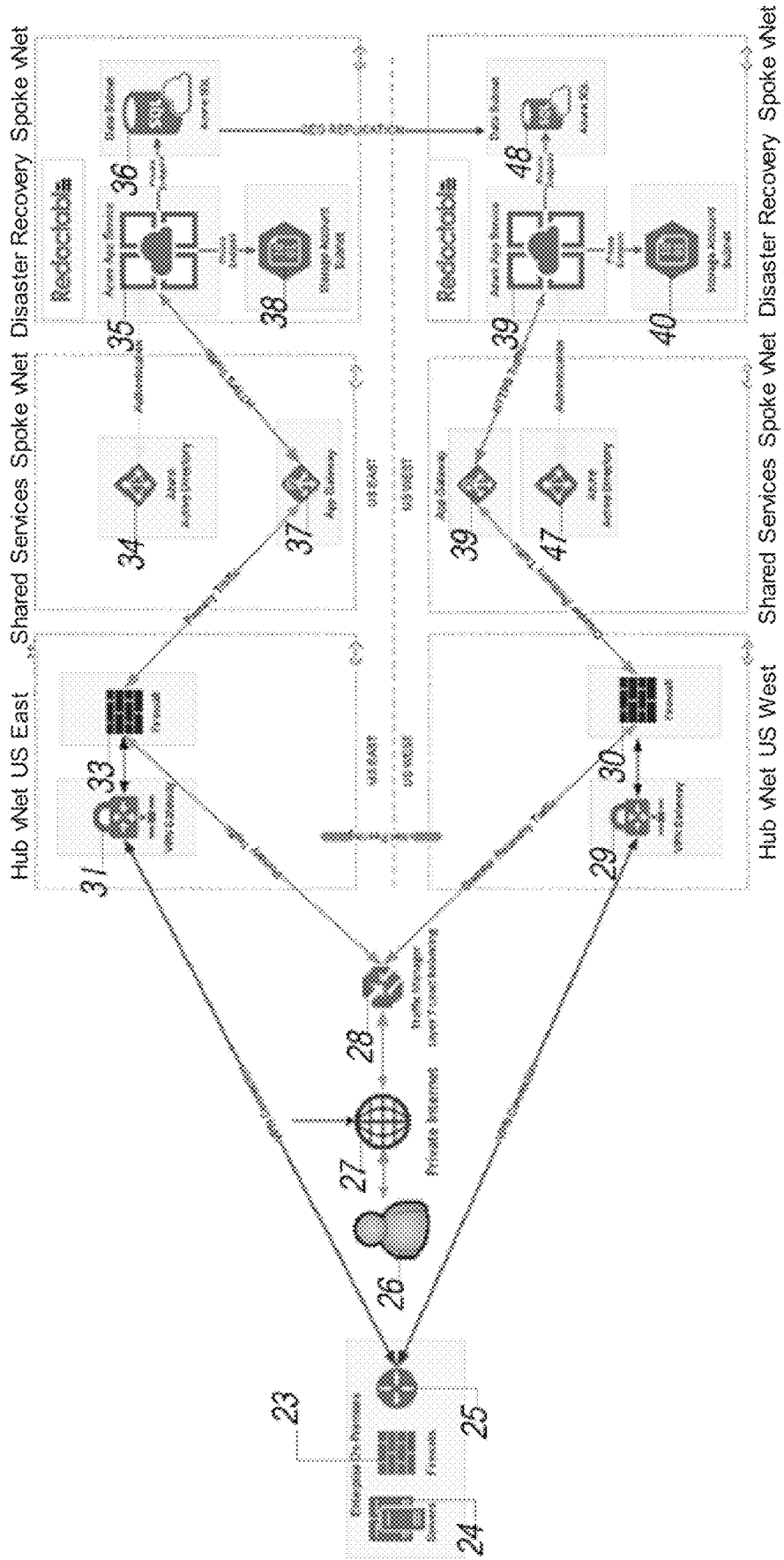
FIG. 2 illustrates information flow among, and services provided by, components of an embodiment in deployment to an enterprise client system.

FIG. 2 illustrates an example information flow among, and services provided by, components in deployment to an enterprise client system (ECS). Illustrated are example functions and interactions within an ECS that has East and West geographic locations within the United States. The illustrated ECS has servers 24 with security firewalls 23 and gateways 25. Employees 26 have access to a private internet 27 which includes a traffic manager 28. In the East, primary traffic interacts with hub US East (with VPN gateway 31 and firewall 33), shared services (with Azure Active Directory 34 and app gateway 37) and redaction production (with Azure App Services 35, data SQL subnet 36, and storage account subnet 38). In the West, primary traffic interacts with hub US West (with VPN gateway 29 and firewall 30), shared services (with Azure Active Directory 47 and app gateway 39) and redaction production (with Azure App Services 39, data SQL subnet 48, and storage account subnet 40).

Figure 3:
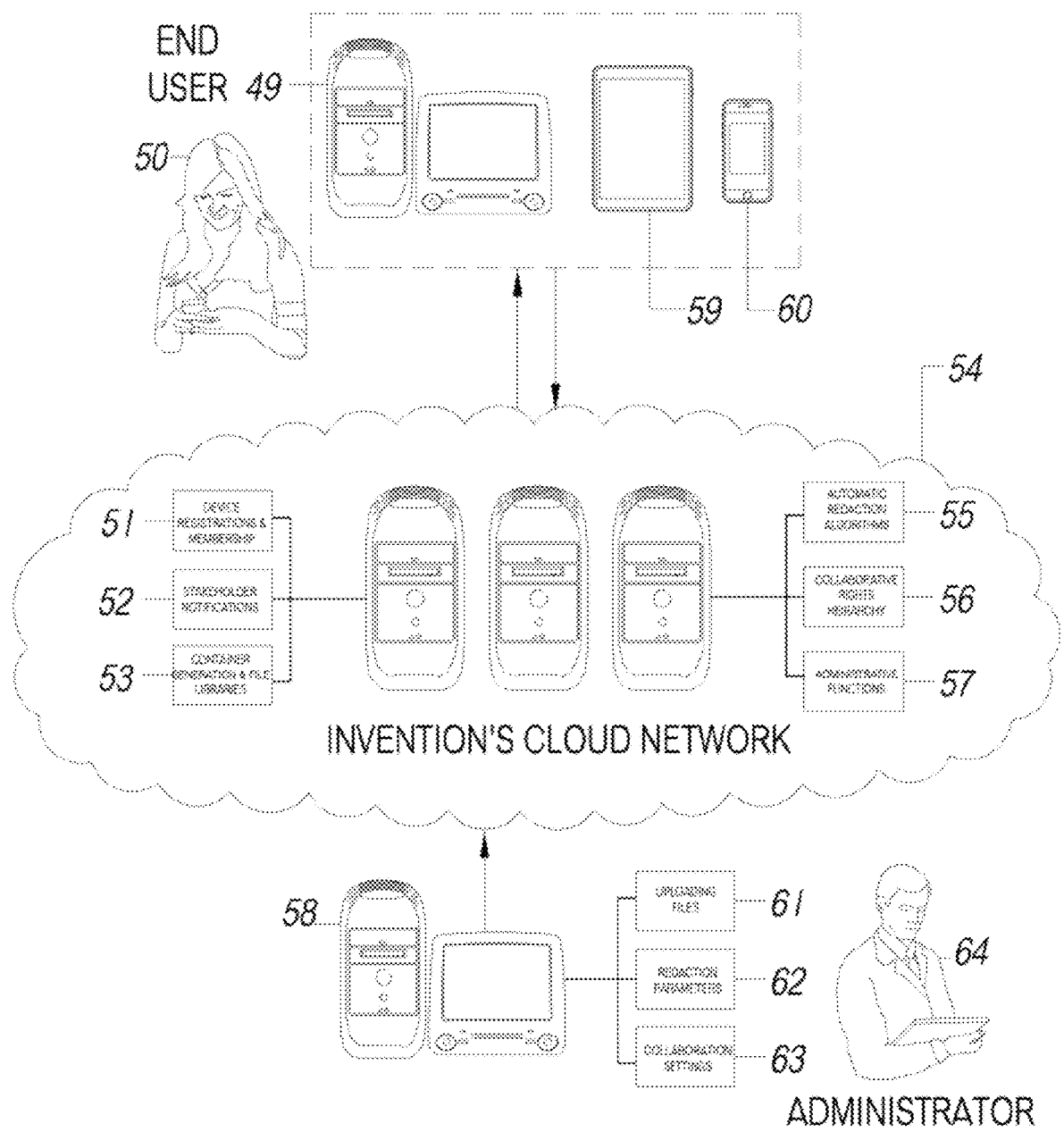
FIG. 3 illustrates certain group collaboration and networking features of an embodiment in deployment to an enterprise client system.

FIG. 3 illustrates an example certain group collaboration and networking features of an embodiment in deployment to an ECS. Illustrated is an embodiment in operation from a user viewpoint. End users 50 (generally company employees using computing devices 49, 59 and 60 for example) and company administrators 64 (using computing device 58 for example) can perform functions such as, but not limited to, uploading a multitude of file types 61 across a plurality of local and remote online networks; setting redaction parameters 62 (including but not limited to manual selection, algorithm-governed selections based on phrase trends and pattern identification, etc.) and setting collaboration settings 63 (including but not limited to redaction permissions, user hierarchies, and the like). Illustrated are both administrator 64 and end users 50 interacting with a cloud network 54 of the document redaction system (this is, for example, a cloud system used by the redaction software separate from the CDMP of the ECS to which the redaction container is deployed). The cloud network 54 engages in a multitude of processes such as but not limited to performing user device registrations, subscriptions and levels of service 51, stakeholder notifications 52 (including but not limited to SMS, text messaging, etc.), container generation and file library operations 52 (including but not limited to archiving original and duplicate redacted files, etc.), activation of automatic redaction algorithms 55 (including but not limited to data pattern searching, text trend searching and code searching, etc.), the aforementioned collaborative rights hierarchy assignments 56 as well as administrative functions 57 (including but not limited to member payments and financial transactions, etc.).

Figure 4:
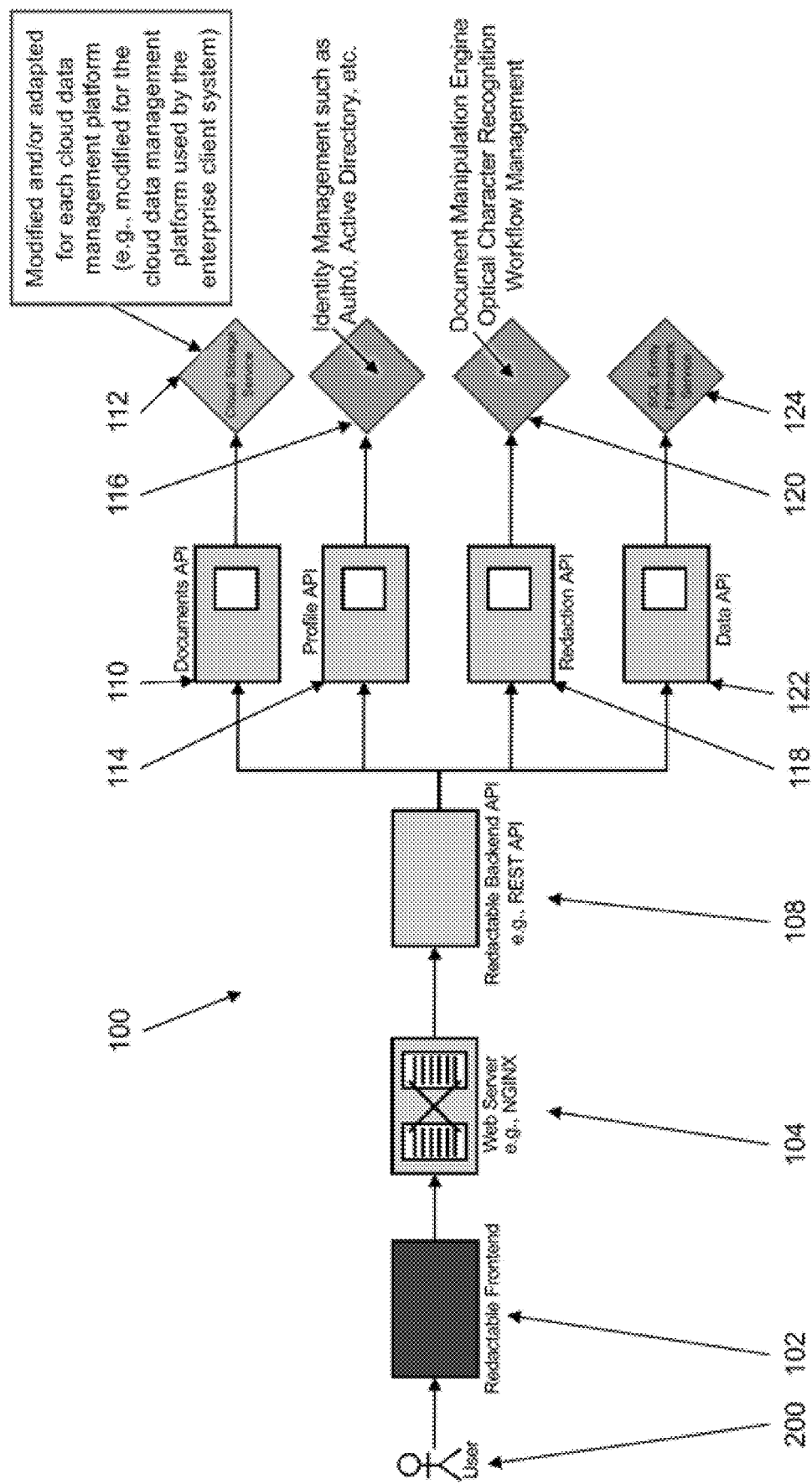
FIG. 4 illustrates component and functional elements of a document redaction system and method according to an embodiment of the disclosure.

FIG. 4 illustrates component and functional elements of a document redaction system and method according to an embodiment of the present disclosure. As illustrated, the document redaction system comprises a redaction container 100 that includes redaction software 104 (e.g., operating on a web server and described in the context of at least FIG. 10) and a redaction application programming interface (R-API) 108 that is configured for deployment to an enterprise client system (ECS). In an example, the R-API is deployed to an ECS by configuring one or more software services with the following functionalities:

- tracking user interactions with web and mobile applications and providing tools for targeted communication with them, e.g., Mixpanel;
- maintaining persistent connections between the server and the client, as and when new data is added to the server, e.g., Pusher using WebSockets;
- managing data using an object storage architecture, e.g., AWS S3 storage;
- using natural language processing (NLP) that uses machine learning (ML) to uncover information in unstructured data and text within, e.g., AWS Comprehend;
- supporting programmatic sending of messages via web service applications using, for example, a distributed message queuing service, e.g., AWS Simple Queue Service (SQS);
- creating, managing, and controlling cryptographic keys across applications using both hardware and software, e.g., AWS Key Management Service (KMS);
- supporting authorization and authentication, e.g., Auth0; and/or
- supporting transactional and marketing emails via a cloud-based communication platform or service, e.g., SendGrid.

The illustrated R-API 108 includes a redaction user interface 102 which users (such as, for example, user 200) can use to interact with and control the system components and functions, e.g., by using a redaction web app.

The illustrated R-API 108 includes a documents application programming interface (D-API) 112 that integrates with a cloud data management platform (CDMP) of the ECS by way of a cloud storage service 112. An example of D-API integration with the CDMP is described in the context of FIG. 5.

The illustrated R-API 108 includes a profile application programming interface (P-API) 114 that integrates with an identity management framework (IMF) of the ECS by way of an identity management service 116. An example of P-API integration with an IMF is described in the context of FIG. 7.

The illustrated R-API 108 includes a redaction application programming interface 118 that provides or facilitates, by way of a redaction management service 120, functions such as document manipulation, optical character recognition, workflow management, and related functions. Different redaction methodologies are described in the context of FIGS. 10-32.

Figure 7:
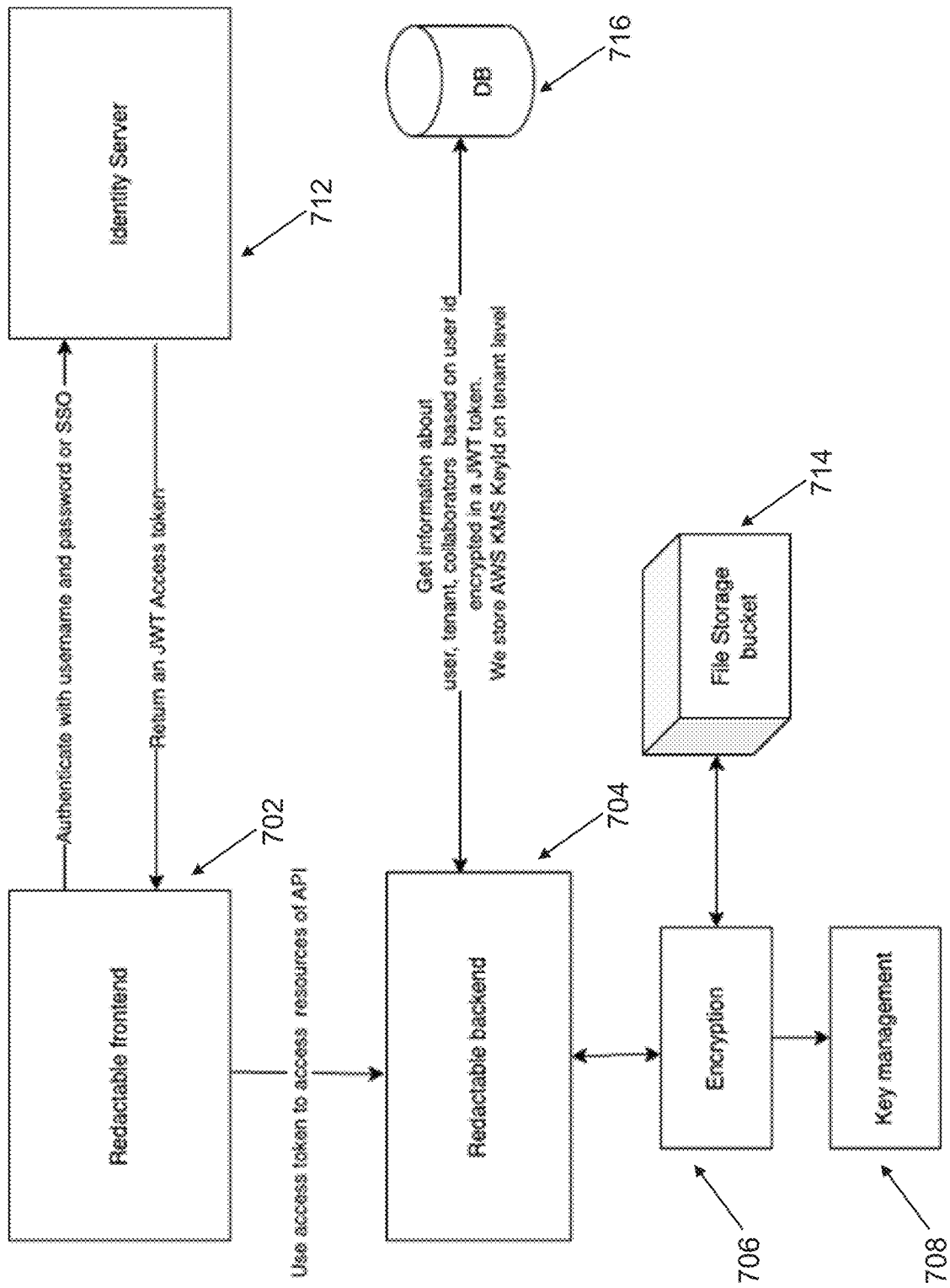
FIG. 7 illustrates an example process flow of the authentication process.

The illustrated R-API 108 includes a data application programming interface 122 that provides or facilitates, by way of a database management service 124 functions such as a Structured Query Language (SQL) entity framework service and related functions. In an example, the database management service 124 provides language and programming support for accessing relational databases, and is used in the redaction process (e.g., as illustrated in FIG. 5) and the authentication process (e.g., as illustrated in FIG. 7).

Figure 5:
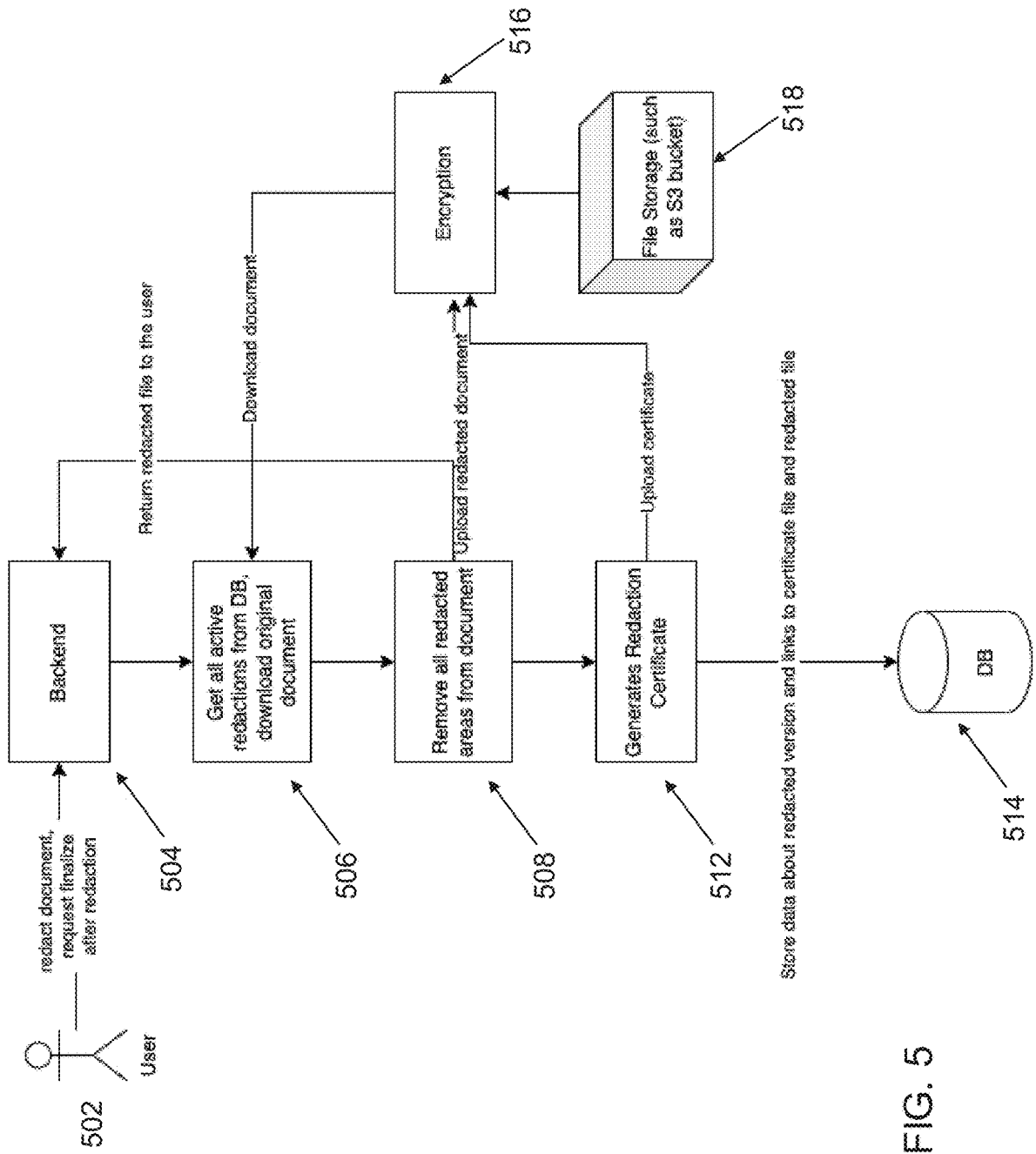
FIG. 5 illustrates an example process flow of the redaction process using the document application programming interface (D-API).

FIG. 5 illustrates an example process flow of the redaction process using the document application programming interface (D-API). As shown therein, a user 502 redacts documents and requests a finalization after completing the redaction process from backend 504. In an example, the user leverages the D-API to perform one or more redaction operations that include:

- CRUD: Create, Delete Update, Delete;
- CRUD of document entity: support document upload, delete and rename; and
- CRUD of document redaction entity: support add redaction, delete redaction, update redaction made by the user in document redactor.

As part of the flow process shown in FIG. 5, operation 506 includes retrieving all active redactions from the database and downloading the original document (which may be encrypted 516). In operation 508, all the redacted areas are removed from the document, and the redacted document is returned to the user and encrypted. As part of the finalization procedure, a redaction certificate may be generated, at operation 512, which is also provided to the encryption unit 516 and stored with the redacted document in the database 514. In some embodiments, an external file storage 518 may be used in addition to the database. In other embodiments, the user can request a specific version of the document, which may include a different set of redactions as compared to the current version. Here, the specific version of the redacted document is returned with the redaction certificate that was issued during its creation. In yet other embodiments, the user may replace the current version of the redacted document with a specific (previous) version of the redacted document. In these embodiments, the finalization procedure is performed as described with respect to the version of the redacted document finally selected by the user.

Figure 6:
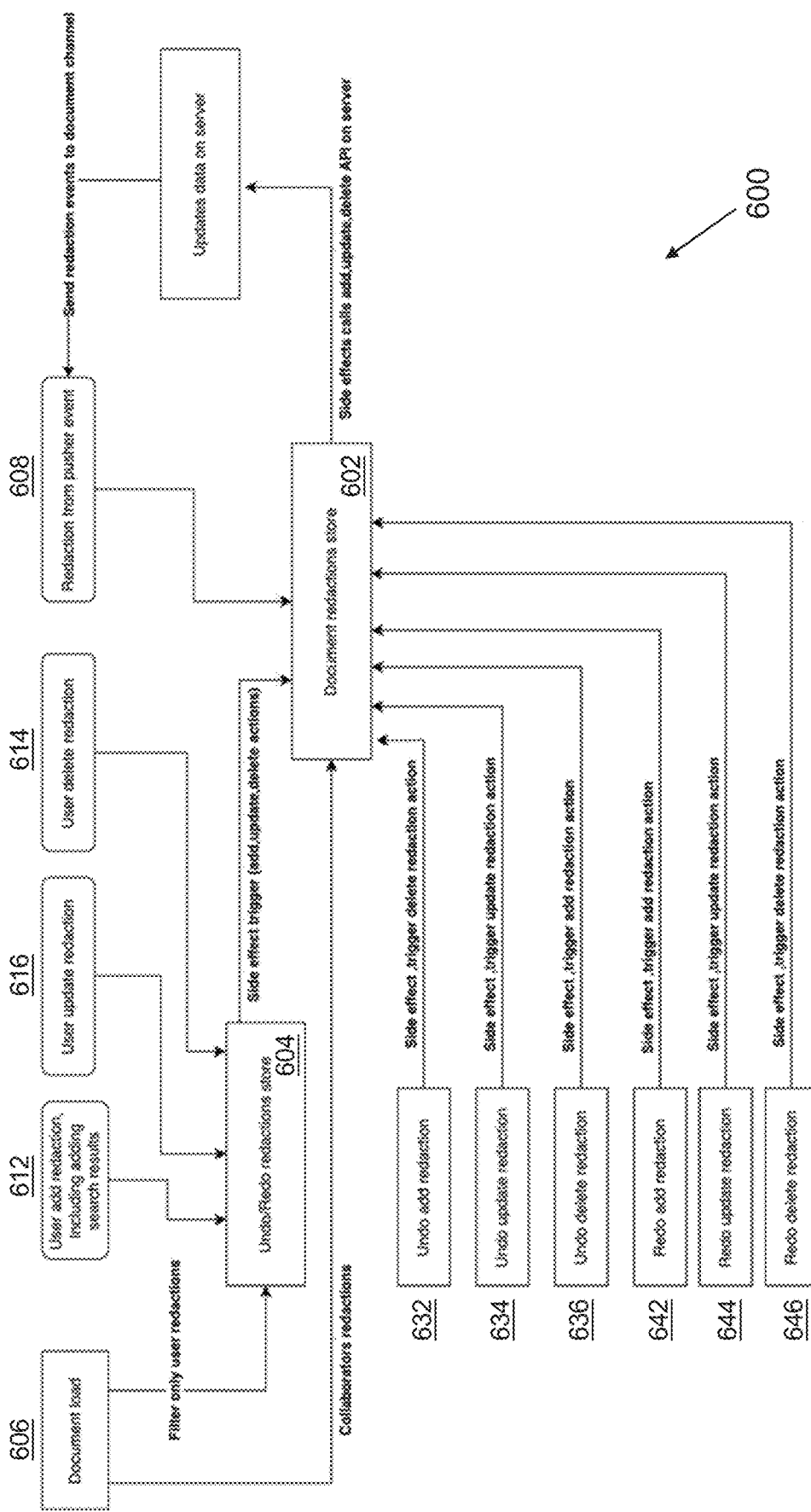
FIG. 6 illustrates an example process flow of the redaction process for an end user.

FIG. 6 illustrates an example process flow 600 of the redaction process for an end user. As shown therein, the redaction process is implemented using a first memory 602 and a second memory 604, wherein the former stores redactions to a document and the latter stores specific redaction actions by a particular, e.g., adding (612), deleting (614), and/or updating (616) redactions. The first memory 602 stores an entire document (606) that includes redactions by multiple collaborators, redactions to the document that were saved on a server (608, via a Pusher WebSocket), and the redaction actions from the particular user that were stored in the second memory 604. The first memory is further configured to update data on the server (622) to ensure consistency between local and remote versions of redacted documents. Mirroring the "undo" and "redo" functionality in a word processor, the document stored in the first memory 602 is updated if any specific redaction actions are undone (632, 634, 636) or redone (642, 644, 646).

FIG. 7 is an example process flow of the authentication process, which illustrates the integration of the profile application programming interface (P-API) with the identity management framework (IMF). As shown therein, the frontend 702 uses authentication protocols (e.g., OAuth 2.0) with single sign-on (SSO) or a username/password combination to communicate with the identity server 712. Upon authentication, the identity server 712 provides the frontend 702 with a token (e.g., a JWT Access token), which is used to access the resources of the API via the backend 704. In an example, the token includes encrypted user details, e.g., UserID, Name, Email, Issued server, and/or Expiry, and based on the validity of the token, information regarding the user is pulled from the database 716. In this implementation, all user permissions, KMS KeyId, collaborators, and tenant users are stored in the database 716. The key management 708 and file storage 714 contents are encrypted (706) when initially accessed by the user. A server checks the user information against the token-issued server, expiration time, and encryption key. If any one of those checks fail, the user is considered unauthenticated and unauthorized to execute any request to API.

Figure 8:
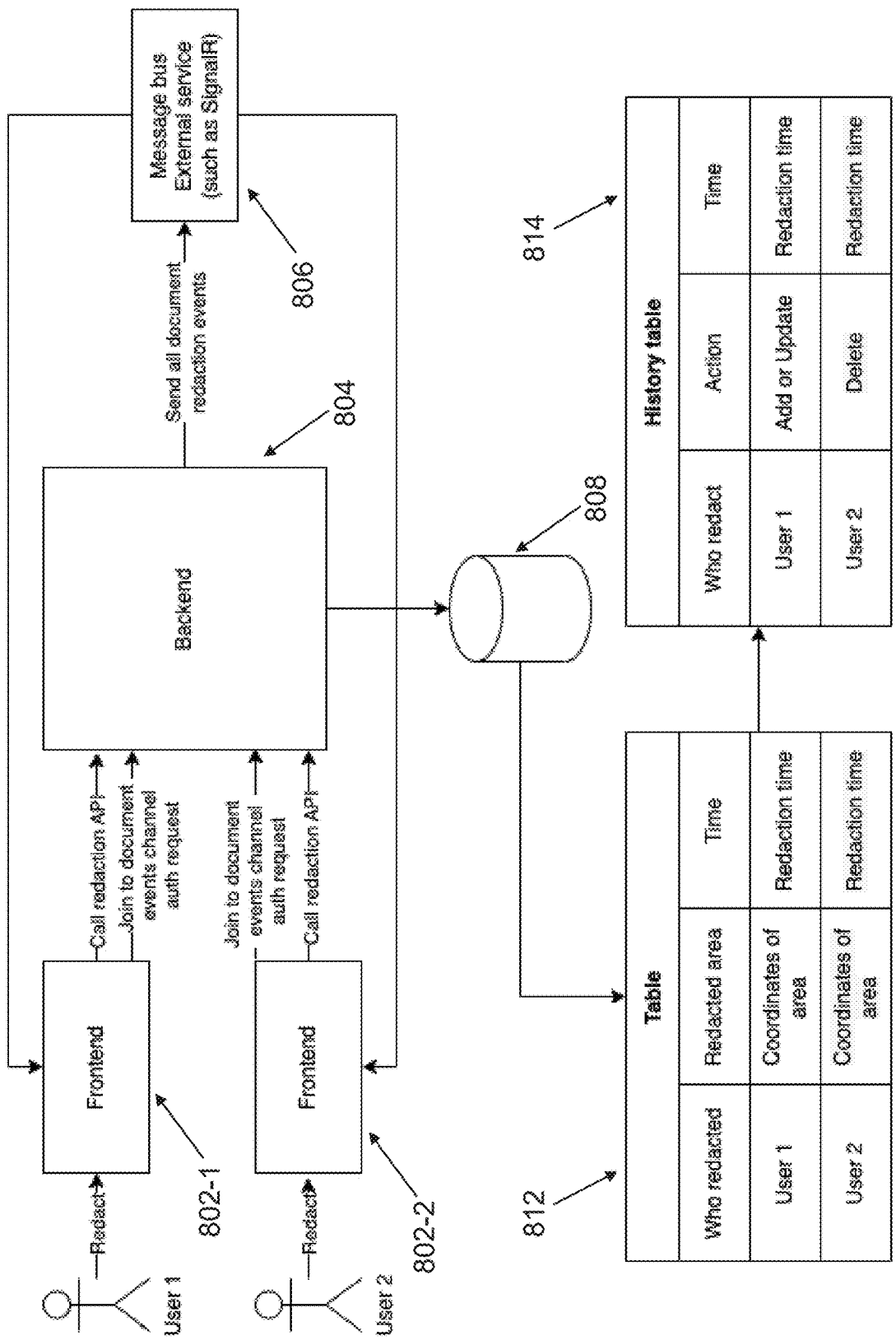
FIG. 8 illustrates an example process flow for the simultaneous redaction of the same document across multiple users.

FIG. 8 illustrates an example process flow for the simultaneous redaction of the same document across multiple users. As shown therein, user/actor 1 access a frontend 802-1 to redact a document, which is also being redacted by user/actor 2 using another frontend 802-2. In this example, a document events channel implemented with a WebSocket is available, and authentication for each of the users goes through the backend 804. A user requests a document channel based on its identifier, the backend 804 checks if the user has access to the document, and returns an authentication token to the channel, and the frontend (802-1 or 802-2 for user 1 or user 2, respectively) connects to the document channel with the provided token.

When the user makes a redaction, the redaction is stored (in database 808) by calling the backend 804 API, which sends an event to the document channel regarding any redaction event associated with this document. The database stores both a table 812 and a history table 814 to track which user performed which redaction action (e.g., add, delete, update), at which time, and to what portion of the document (e.g., using coordinates references to a specific corner of the document). The redaction is provided, via an external message bus service 806, to the users in real-time through the user interface on the respective frontend.

Figure 9:
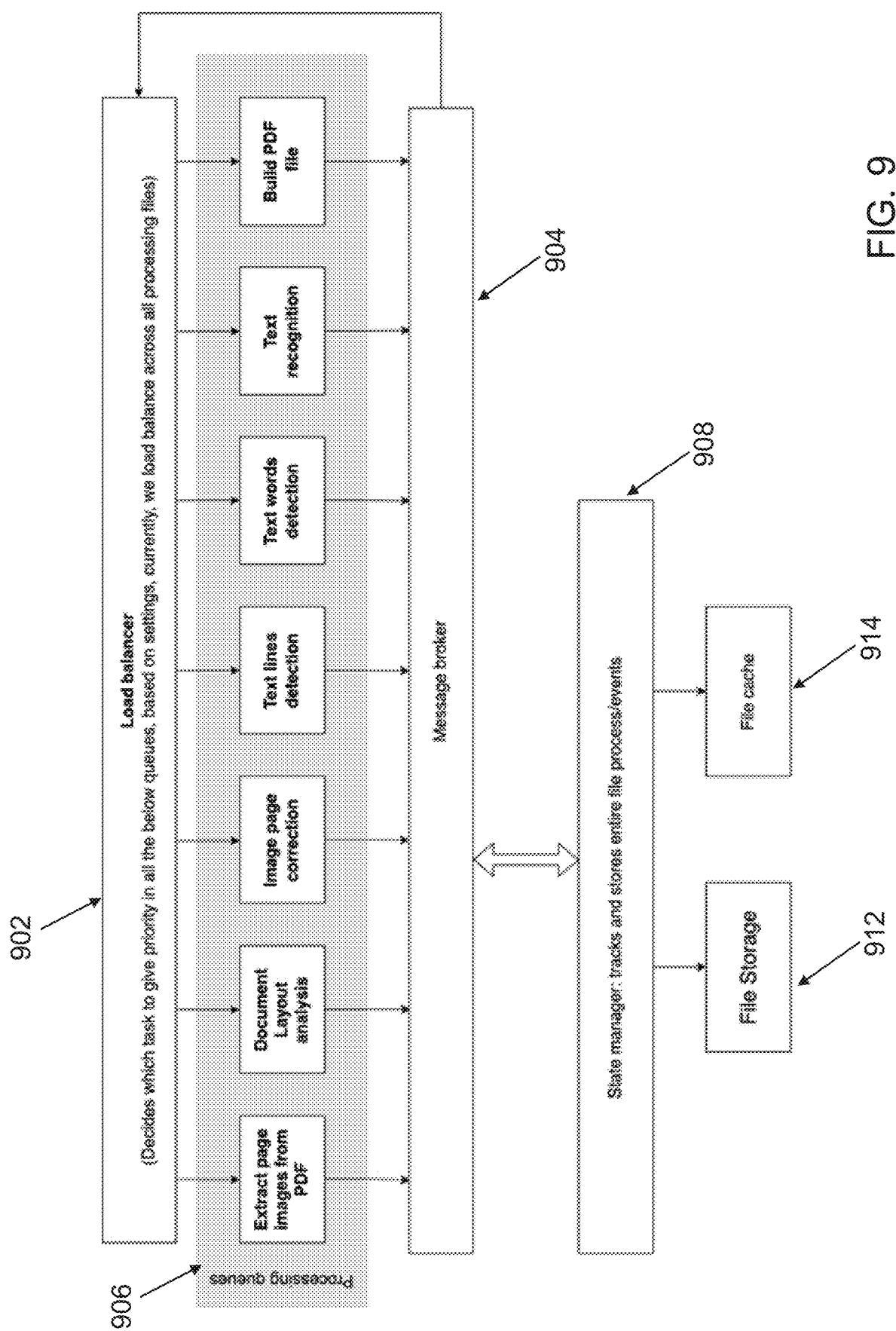
FIG. 9 illustrates an example process flow for optical character recognize (OCR).

FIG. 9 illustrates an example process flow for optical character recognize (OCR). When a user uploads a file (or, equivalently, a document), the R-API sends a request to the OCR service to determine whether that file requires processing using the OCR service. In an example, the processing includes:

1. Performing a "fast OCR check" by checking whether the document has any text. If there is no text, the document is marked as requiring full OCR and goes into the state machine 908 with a status indicating that a full OCR is required for this document. In this example, the state machine 908 is configured to interface with a file storage 912 and a file cache 914.
2. The state machine 908 starts a process for this file. The state machine 908 is configured so that the process tracks the entire OCR process 906 for that file.
3. Commands are sent to the message broker 904 to extract pages from the file. After the pages are extracted, a ready event message is sent.
4. The ready event message is consumed by the load balancer 902, and based on how many files are currently being processed, it determines a processing order for the file. The load balancer 902 handles all the steps in the OCR process 906, which include page image extraction from the file, document layout analysis, image page correction, text line detection, text word detection, text recognition, and building the output file.

In some embodiments, each of the tasks in the OCR process 906 shown in FIG. 9 are decoupled so that they can be executed independently and in parallel. In an example, persistent queues (that are configured to protect against message loss during a normal shutdown or abnormal termination) are used to implement the OCR process 906, with one persistent queue being implemented per task. In an example, the load balancer 902, working in conjunction with the state manager 908, is configured to track (i) the backlog in each persistent queue (associated with each of the tasks in the OCR process 906), (ii) the number of pages in received document that have already been processed, (iii) the number of pages in the document that still need to be processed, and (iv) any priority information associated with a received document, to determine the processing order.

5. When the message broker 908 determines that all the pages in the file have been processed, it sends a command to the load balancer 902 to build the output file.
6. When the output file is ready, it is uploaded to storage (e.g., S3 storage) in place of the original file, and an event indicating storage completion is sent to the message broker and forwarded to the R-API.

In some embodiments, and for each page, the OCR process 906 performs image skewing correction, denoising the image for better recognition, detecting word boundaries to ensure that the output file is accurate and matches the fonts of the original file.

In some embodiments, the pre-processing module (not shown in FIG. 9) identifies documents that need to be processed by performing the "fast OCR check." In an example, the pre-processing module checks the metadata associated with the file (document or page of the document) to determine whether the file is machine readable. In another example, the pre-processing module selects one or more random areas of the page and performs a minimal set of tasks (e.g., text line detection and text word detection) to determine whether the document has any text on it.

In some embodiments, the load balancer 902, in conjunction with the state manager 908, tracks all the files (documents or pages) that are being processed. Upon receiving or while tracking a file, the load balancer 902 checks the status of each of the OCR tasks that need to be performed for that file. In an example, tracking the OCR processing of a file uses a Boolean array that uses a "0" to indicate that a task has not been completed and a "1" to indicate that a task has been performed. Based on a set of predefined metrics (e.g., a processing time for the OCR process 906, a user-defined processing ordering, or a number of pages in the received documents), the load balancer 902 determines, at a specific time, which file should be processed by which task and sends that particular file to be processed by the designated tasks. The load balancer 902 also considers the time that each of the tasks take (e.g., maximum time, average time, median time) and uses this information to determine which files should be processed by which task.

In some embodiments, the message broker 904 is configured to pass event messages between the state manager 908, the OCR process 906, and the load balancer 902. The message broker 904 includes a message queue that stores and orders the messages until the consuming applications can process them. In a message queue, messages are stored in the exact order in which they were transmitted and remain in the queue until receipt is confirmed. The message broker 904 is typically configured to operate in a point-to-point messaging mode, but can switch to a publish/subscribe messaging mode if multiple instances of the OCR process 906 are instantiated to handle a larger volume of files (documents and/or pages).

In an example, when a file is already being processed, the message broker 904 receives a message that includes the status (e.g., the Boolean array) and metadata from the status manager 908, and forwards another message that only includes the status to the load balancer 902 because this is the only information the load balancer 902 needs at this time to determine what additional processing has to be performed on that file. In another example, the message broker 904 receives messages from each of the (persistent) processing queues that are part of the OCR process 906, and relays them to both the state manager 908 (which updates the status for that particular document/page) and the load balancer 902 (which can now determine the next processing step for that particular document/page).

Embodiments of the disclosed technology enable the processes described in FIGS. 5-9 to be run at any scale by implementing queues for each individual task. Furthermore, server resources can be distributed in different ways, e.g., per file, per tenant, per user, etc.

Example Embodiments of Redaction Methodologies

Figure 10:
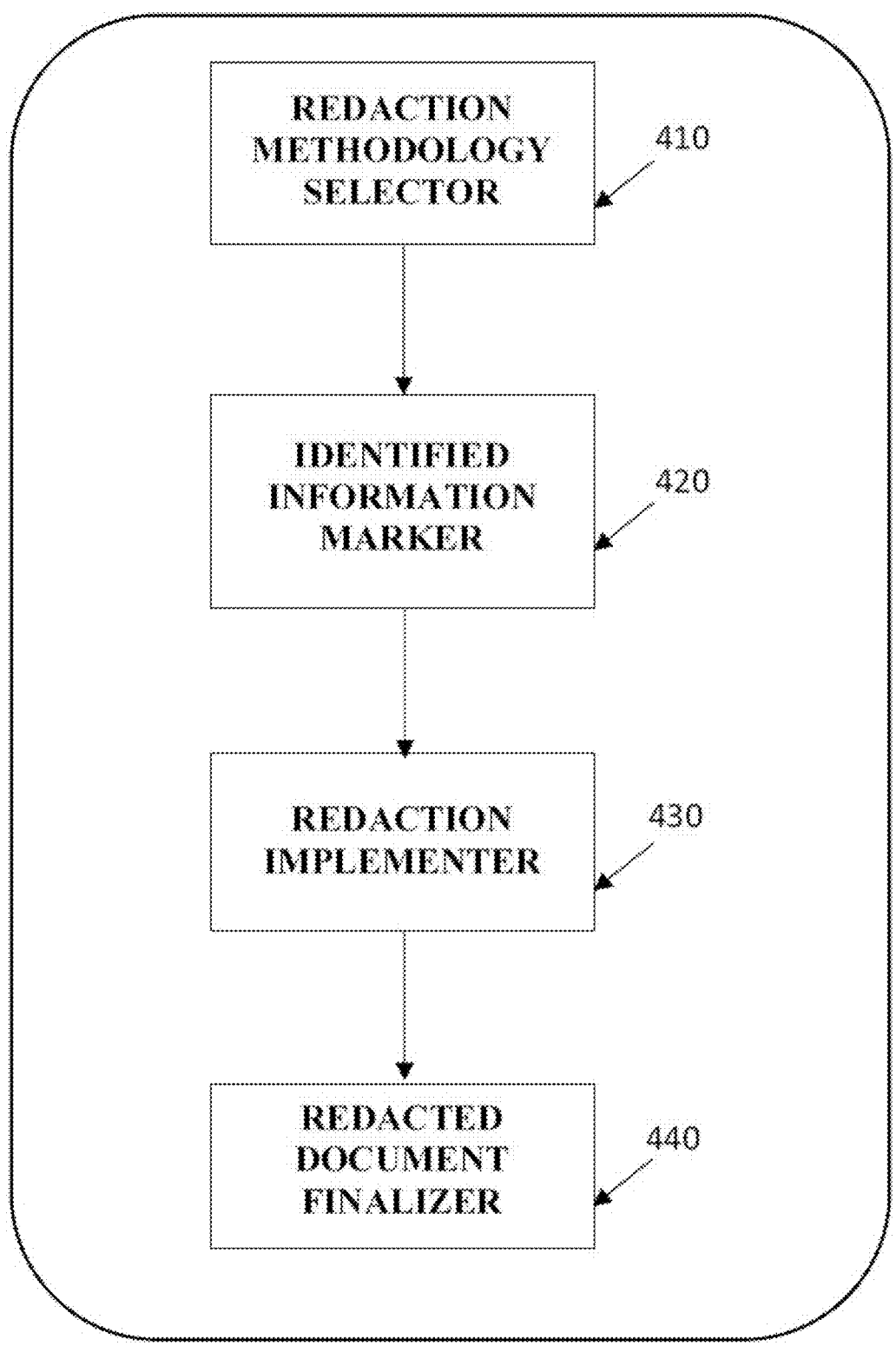
FIG. 10 illustrates functional elements of an example redaction system.

In some embodiments, and as shown in FIG. 10, an example redaction system includes a redaction methodology selector 410, an identified information marker 420, a redaction implementer 430, and a redacted document finalizer 440.

It should be noted that elements of the system indicated as functional blocks for performing various processing operations may be implemented in any now known or hereafter developed manner, including but not limited to by hardware such as, for example, a circuit and memory, by software such as, for example, a program loaded into memory, or a combination of both hardware and software. That is, it will be understood by those skilled in the art that the functional blocks may be variously implemented by hardware only, by software only, or by a combination of hardware and software. The method of implementing the functional blocks is not limited. Communication among elements may be provided through a communications network such as, for example, the Internet by using any now known or hereafter developed communication protocols such as, for example, World Wide Web, Hypertext Markup Language (HTML) and Cascading Style Sheet (CSS) protocols, or provided by being stored in and/or provided through a computer-readable information storage medium such as, for example, a data storage device.

The redaction methodology selector 410 is configured to select a desired redaction methodology for identifying information to be redacted. In an example, the redaction methodology selector 410 receives an input from the user (e.g., through the user interface or a command line interface), which is then processed to determine the desired redaction methodology. In the example shown in FIG. 11, the redaction methodology selector 410 accepts an input from the user indicative of the user having selected one of the panels corresponding to each of the methodologies. Alternatively, the redaction methodology selector 410 could use radio buttons or checkboxes to receive an input. In the latter case, the described embodiments are configured to ensure that multiple methodologies, if selected, do not conflict with regard to their operation.

In some embodiments, the redaction methodology selector 410 is configured to receive an input from the user indicative of a selected methodology. Upon receiving the input, the redaction methodology selector 410 loads the functionality and associated tools and utilities for the selected methodology so that the user is able to use the appropriate functionality, tools, and utilities for the redaction process. In an example, the functionality, tools, and utilities are loaded by the redaction methodology selector 410 with default configurations (e.g., using black boxes to redact text associated with specific formatted fields). In another example, the functionality, tools, and utilities are loaded with a customized configuration specified by the user (e.g., using non-alphanumeric characters to replace text associated with those specific formatted fields).

The identified information marker 420 is configured to mark the identified information for redaction, and the redaction implementer 430 is configured to perform redaction on the marked information. The functionality of the identified information marker 420 and the redaction implementer 430 is discussed in the context of the specific redaction methodologies (e.g., see FIG. 11).

In some embodiments, the identified information marker 420 is configured to be the first process that is executed when the user begins the redaction process. In an example, the identified information marker 420 tags the specific portions of the document that the user has selected (or identified) for redaction. The tags used by the identified information marker 420 may include page coordinates, e.g., referenced to the top-left corner, page portions (e.g., top half of page, left bottom eight of page), or a portion of the page that is used by a single object (e.g., the area of the page corresponding to an image or a table). Furthermore, the identified information marker 420 can store the type of redaction intended by the user (or associated with the specific redaction methodology that is indicated by the redaction methodology selector 410) along with the coordinates or page portions.

In some embodiments, the redaction implementer 430 works in conjunction with the identified information marker 420 to implement the redaction that is being performed by the user. The identified information marker 420 uses the information in the tags that were generated by the identified information marker 420 to implement the redaction. The redaction implementer 430 replaces the portions identified for redaction by the type of redaction that is specified. In an example, an image that is to be redacted is replaced by either a black (or pattern filled) box or a white box with a black background by the redaction implementer 430. In another example, any text marked for redaction is replaced by Unicode text, solid boxes, characters spelling a phrase of one or more terms (e.g., "lorem ipsum"), randomized characters, space characters, or blurred text.

The redacted document finalizer 440 is configured to save a redacted version of the document, in which the marked information has been replaced with desired placeholder information. In an example, the desired placeholder information includes at least one of Unicode text, a set of one or more solid boxes, a set of one or more characters conveying information, a set of one or more characters spelling a phrase of one or more terms, a randomized set of one or more characters, a set of one or more space characters, blurred text, and blurred image. The redacted document finalizer 440 saves the redacted version of the document in place of the original document and may further generate and save a redaction certificate (e.g., see FIG. 5). Alternatively, the redacted document finalizer 440 saves the redacted version of the document along with the original document and changes the filename (e.g., adding "_redacted" to the filename).

Figure 11:
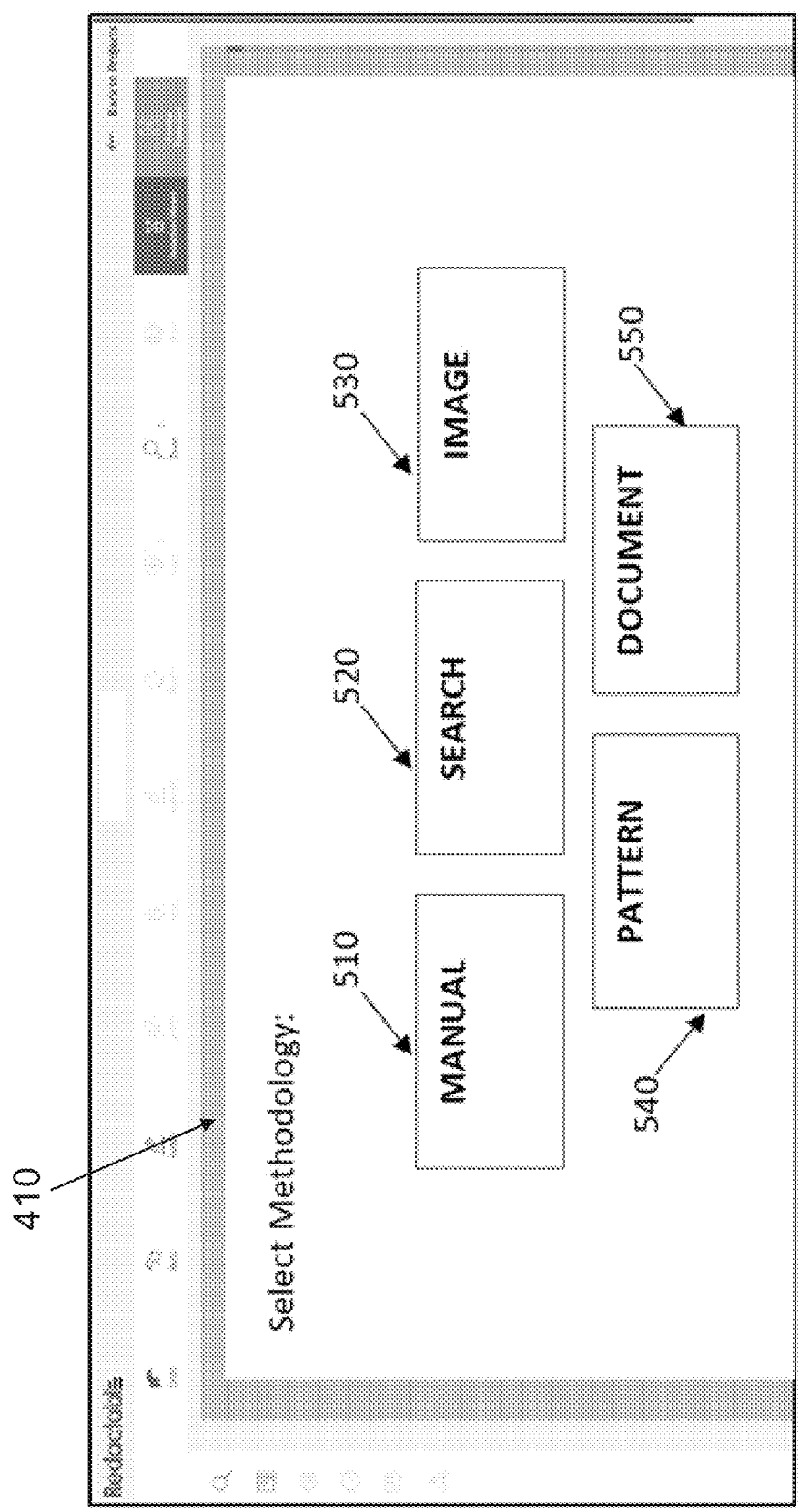
FIG. 11 illustrates a user interface showing a plurality of methodology selection panels.

With reference to FIG. 11, the redaction methodology selector 410 is configured to select a desired redaction methodology for identifying information to be redacted. As shown in FIG. 11, the desired methodology is selected from a selection set including at least one of manual methodology, search methodology, image methodology, pattern methodology and document methodology.

In some embodiments, the redaction methodology selector is configured to accept, as the selection of the desired methodology, a user selection of the desired methodology. For example, FIG. 11 illustrates a web page that shows a user interface for the system of the invention, which presents a plurality of methodology selection panels. For example, the interface presents a manual methodology selection panel 510, a search methodology selection panel 520, an image methodology selection panel 530, a pattern methodology selection panel 540 and a document methodology selection panel 550. A user can select the methodology selection panel associated with the methodology the user wishes to use. It should be noted that fewer or more methodology selections panels, of these or other types, without or without other user interface elements, are contemplated by the invention. In other embodiments, the redaction methodology selector may select a methodology for the user, based on one or more variables, conditions, or criteria.

If the selected methodology is manual methodology, the information to be redacted is any content in the document, and the information is identified by a user navigating the document and selecting the content. It should be understood that any now known or hereafter developed methods of document navigation and document content selection are contemplated by the invention. A non-limiting example of document navigation is scrolling the document in a web browser. Non-limiting examples of document content selection include a user manually selecting, highlighting or otherwise marking information in the document with a user interface tool such as, for example, a cursor by, for example, passing over or clicking on an item of content to select the item.

If the selected methodology is manual methodology, the content includes one or more of a set of one or more characters, images, and pages. For example, the characters can be of any length and of any language. Also, for example, the images can be of any dimension, resolution, or format. Also, for example, the pages can be selected one or more at a time.

If the selected methodology is search methodology, the information to be redacted is one or more terms, and the information is identified by a user providing the terms, the system searching in the document for the terms, and the system finding in the document all instances of the terms.

If the selected methodology is search methodology, the terms are provided by the user inputting one or more characters of a search phrase of one or more terms. For example, the user can input or otherwise provide characters, words, terms, phrases or other search parameters and the system, based on such provided parameters, can search for and locate any corresponding information in the document. A non-limiting example of the user providing search terms is the user being presented with a search box and inputting a search phrase into the search box. In an example, the terms can be provided by the user for multiple queries, and multiple queries can be undertaken by the software substantially simultaneously.

If the selected methodology is image methodology, the information to be redacted is one or more images, and the information is identified by the system detecting in the document the images. Alternatively, if the selected methodology is image methodology, the images are detected by one or more of the following: hard programming, artificial intelligence, machine learning, computer vision, or any other methods or technologies. Alternatively, a user can request that the system detect images in a document, and mark them for redaction or present them to the user as redaction candidates. Non-limiting examples of images commonly sought to be redacted include but are not limited to emojis, graphics, videos, vector images, photos, drawings, and diagrams. Alternatively, the user can provide an image to the system and the system can detect in the document images that are the same, similar, or related to the provided image.

If the selected methodology is pattern methodology, the information to be redacted is content in a format, and the information is identified by a user identifying the format, the system searching in the document for any content in the format, and the system finding in the document all content in the format. For example, a user can select, indicate, or otherwise provide a format in which information to be redacted may appear and request that the system find information in the document that appears in the provided format. Alternatively, if the selected desired methodology is pattern methodology, the format is one or more of email address format, phone number format, name format, date format, currency format, Uniform Resource Locator format, Internet Protocol format, credit card number format, debit card number format, company name format, address format, zip code format, postal code format, location format, government-issued identification number format, company-issued identification number format, social security number format, and identification number format.

If the selected methodology is document methodology, the information to be redacted is sensitive content found in one or more documents of a type of document, and the information is identified by a selection of the type of document and the system detecting the sensitive content based on the type of document. In an example, the information to be redacted is sensitive content that is normally, usually, typically, routinely, commonly, often, historically, on-average, etc. (such terms and their equivalents being referred to herein as "commonly") found in the specified type of document. Non-limiting examples of documents that commonly contain sensitive content include driver licenses, bank checks, passports, company formation documents, social security cards, birth certificates, bank records, and medical records.

Non-limiting examples of sensitive content commonly found in a driver license include a photo of the driver, a name of the driver, an address of the driver, and a driver license number. Non-limiting examples of sensitive content commonly found in a passport include a photo of the passport holder, a name of the passport holder, an address of the passport holder, and a passport number.

If the selected desired methodology is document methodology, the selection of the type of document is achieved by one or more of the user selecting the type of document and the system detecting the type of document. For example, a user can indicate the type of document the user has provided, or the system can detect the type of document the user has provided, and the system can, based on pre-established associations of the type of document with formats in which sensitive information is commonly found in the type of document, and with locations in the type of document in which sensitive information is commonly found, find the sensitive information and mark it for redaction or present it to the user as a redaction candidate. Alternatively, if the selection of the type of document is achieved by the user selecting the type of document, the manner of selection is the user selecting a user interface element associated with the type of document. Alternatively, the user is presented with one or more document type selection panels, each associated with a different type of document, and the user selects the document type selection panel associated with the type of document the user has provided for redaction.

Figure 12:
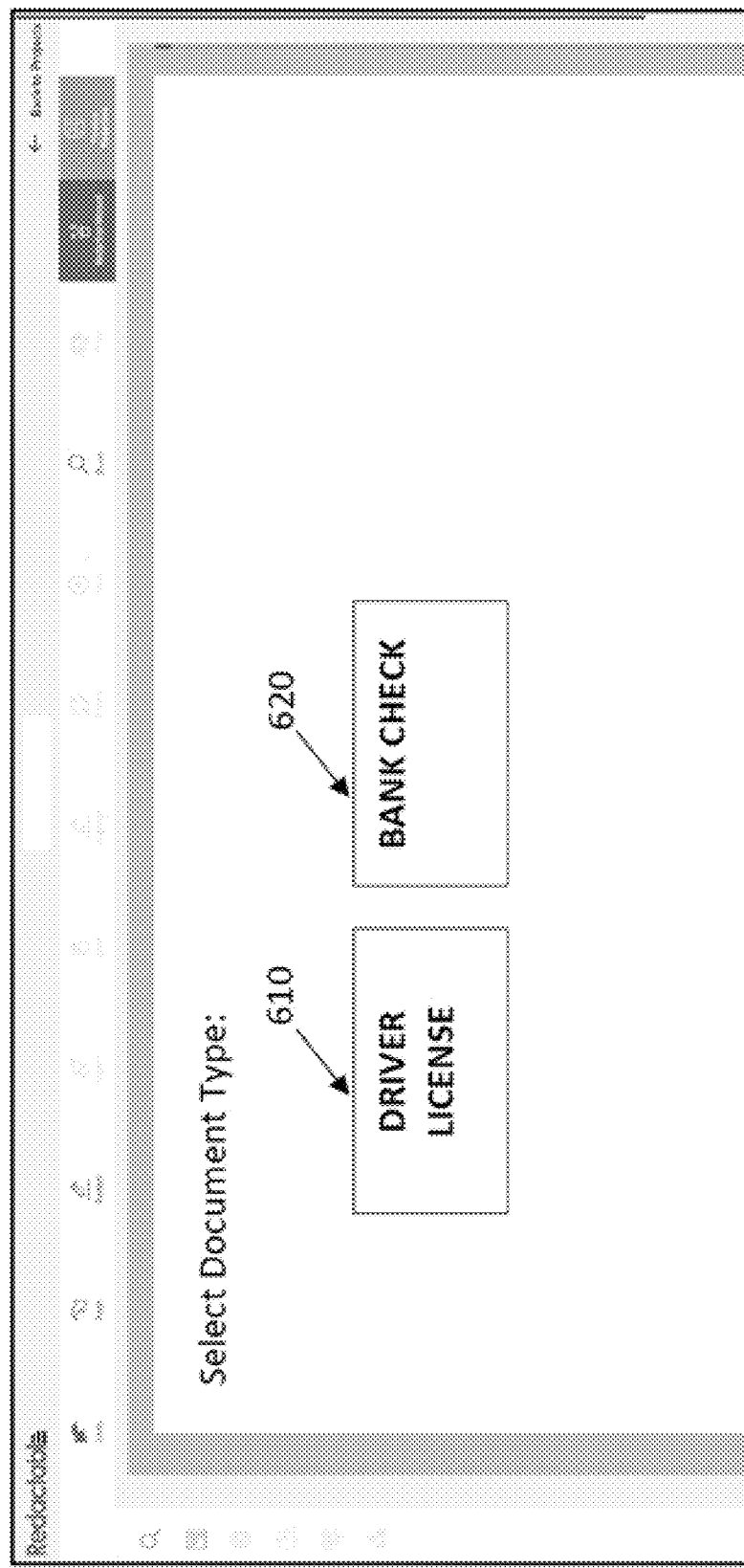
FIG. 12 illustrates a user interface showing a plurality of document type selection panels.

FIG. 12 illustrates a web page that shows an example user interface for the redaction system, which presents a plurality of document type selection panels. For example, the interface presents a driver license selection panel 610 and a bank check selection panel 620. A user selects the driver license selection panel to select driver license as the type of document, or selects the bank check selection panel to select bank check as the type of document. If the selection of the type of document is achieved by the system detecting the type of document, the type of document is detected by one or more of the following: hard programming, artificial intelligence, machine learning, computer vision, or any other methods or technologies.

In some embodiments, if the selected desired methodology is document methodology, the sensitive content is information known to be in a least one of a known format and a known location in the type of document. In an example, the known information is so known based on a pre-established association of one or more of the known format and the known location with the type of document. Associations can be established by hard programming, artificial intelligence, machine learning, computer vision, or any other methods or technologies. In another example, the sensitive content is information detected by, when the known information is information known to be in the known format in the type of document, the system searching in the document for any content in the known format, and the system finding in the document all content in the known format. In yet another example, the known format is one or more of email address format, phone number format, name format, date format, currency format, Uniform Resource Locator format, Internet Protocol format, credit card number format, debit card number format, company name format, address format, zip code format, postal code format, location format, government-issued identification number format, company-issued identification number format, social security number format, and identification number format. In yet another example, the sensitive content is information detected by, when the known information is known to be in the known location in the type of document, the system searching in the document for any content in the known location, and the system finding in the document all content at the known location.

In some embodiments, the system can detect that the document is of a certain type (e.g., driver license, bank check, passport, social security card, etc.), and find sensitive information in the document based on known formats or known locations in in which sensitive information commonly is found the type of document. For example, the system can detect that the document is a driver license, and, based on pre-established associations of the system indicating that a driver license number is in a certain format in a driver license, can search for information in the format and find the driver license number. Further for example, the system can detect that the document is a driver license, and, based on pre-established associations of the system indicating that a driver photo is in a certain location in a driver license, can search for content at that location in the document and find the driver photo. The associations can be established by hard programming, artificial intelligence, machine learning, computer vision, or any other methods or technologies.

In some embodiments, the document is provided by the user to the system in a file type, and the redacted version of the document is saved in the file type, and during identifying the information to be redacted, marking the identified information to be redacted, performing redaction on the marked information, and saving the redacted version of the document, the file type of the document is maintained unchanged from the file type. In an example, the file type is one of an Adobe file type, a Microsoft file type, an Apple file type, and an open-source file type. At least one of the file types is the Portable Document Format (PDF).

In some embodiments, the maintenance of the document unchanged from the file type is achieved by detecting the file type, associating the file type with a container specific to the file type, obtaining content from the document in a manner specific to the file type, storing the content in a cache, displaying the cached content in the container so as to appear as the content would in the document, tracking in a log desired changes to the cached content, and displaying changed cached content in the container so as to appear as the changed cached content would in the document, the changed cached content being the cached content as modified according to the changes indicated in the log. In an example, the container is configured to accept the cached content as input and apply conditions to present the cached content as it would appear in the file type to which the container is specific. Non-limiting examples of conditions include formatting, font changes, font size changes, spacing, positioning, stylization, and coded modifications. In another example, tracking the desired changes in the log includes recording at least one of a location of the change and the change to be made.

Figure 13:
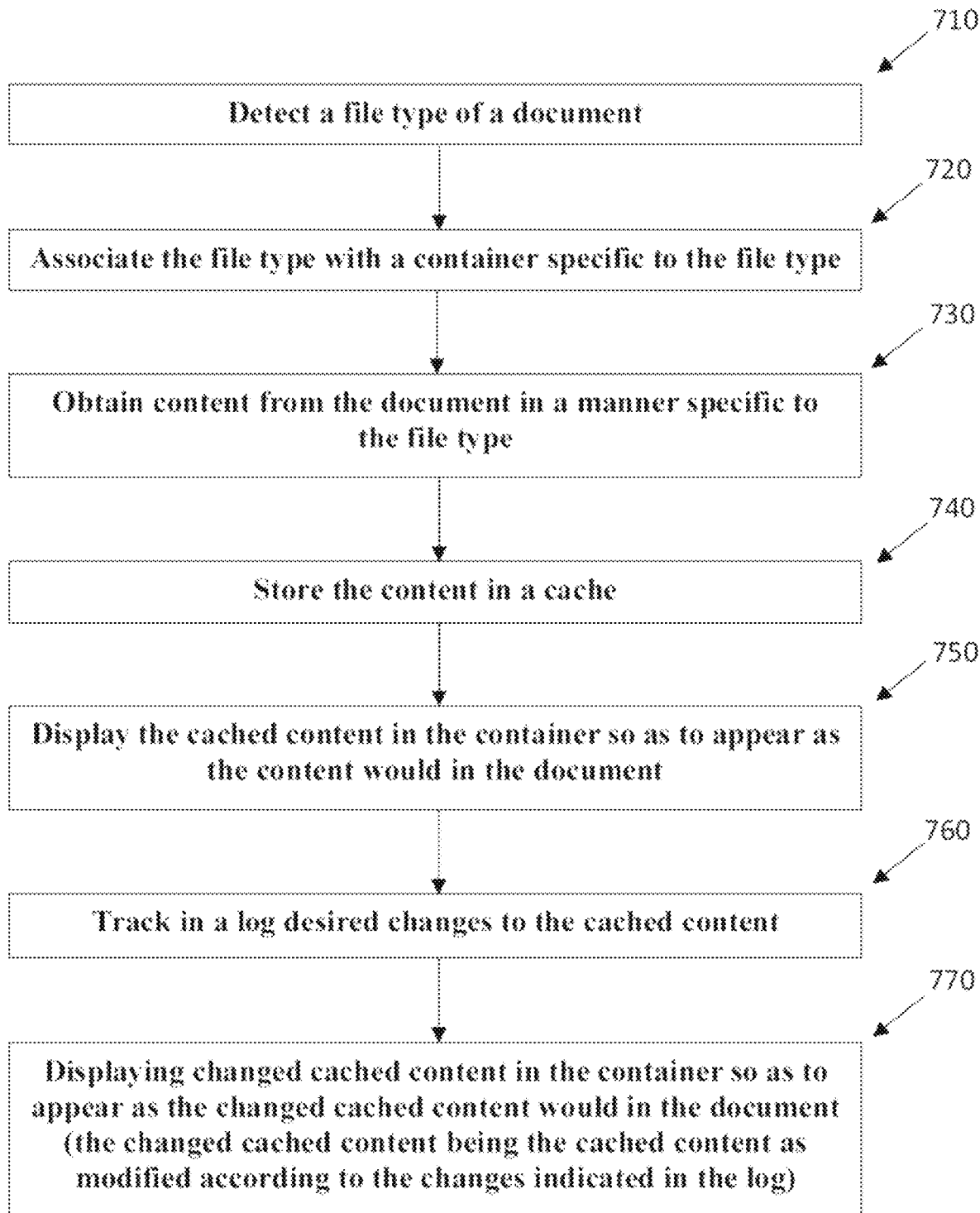
FIG. 13 illustrates a process of maintaining a file type of a document.

FIG. 13 illustrates an example process of maintaining a file type of a document, showing steps of detecting the file type 710, associating the file type with a container specific to the file type 720, obtaining content from the document in a manner specific to the file type 730, storing the content in a cache 740, displaying the cached content in the container so as to appear as the content would in the document 750, tracking in a log desired changes to the cached content 760, and displaying changed cached content in the container so as to appear as the changed cached content would in the document 770, the changed cached content being the cached content as modified according to the changes indicated in the log.

Figure 14:
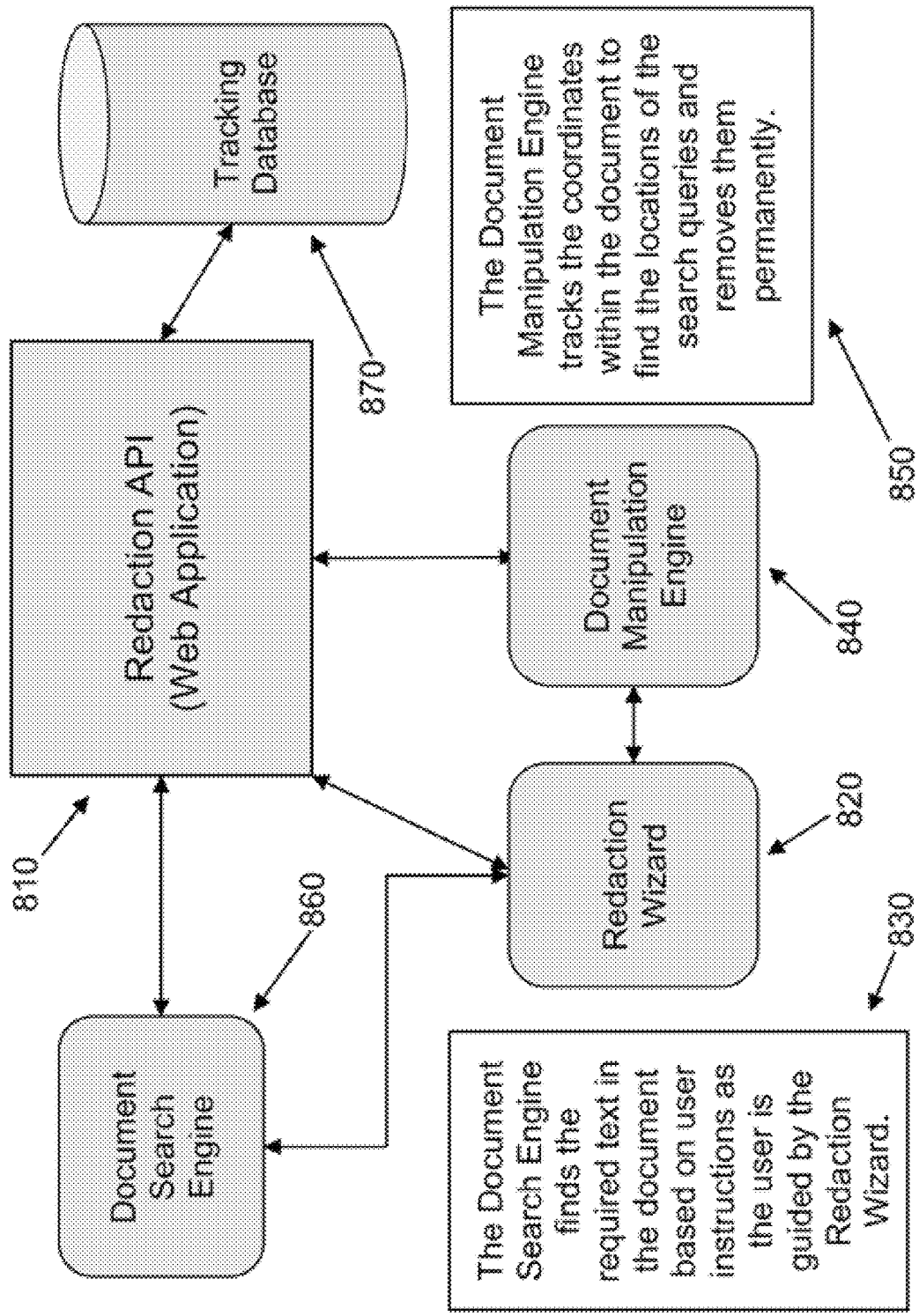
FIG. 14 illustrates Redaction API, Redaction Wizard, Document Search Engine, Document Manipulation Engine, and Tracking Database features of an example redaction system.

FIG. 14 illustrates Redaction API, Redaction Wizard, Document Search Engine, Document Manipulation Engine, and Tracking Database features of an example redaction system. In some embodiments, the Redaction Application Programming Interface (API) 810 is a web application that uses .NET Core on the back end and uses Angular 6 on the front end. The Redaction API serves as a primary component of a redaction methodology selector, effecting the selection of a desired redaction methodology for identifying information to be redacted; an identified information marker, effecting the marking of identified information for redaction; a redaction implementor of the invention, performing redaction on identified information that has been marked for redaction; and a redacted document finalizer, saving redacted versions of a document in which the marked information has been replaced with placeholder information.

In some embodiments, the Redaction API effects the selection of a desired redaction methodology for identifying information to be redacted. For example, the Redaction API utilizes a Redaction Wizard 820. The Redaction Wizard 820 guides a user through the selection and use of the above-described redaction methodologies, and for the document methodology, effects the suggesting to users what information should be redacted from a document based on the type of document (e.g., driver license, bank check, etc.). The Redaction Wizard 820 uses Optical Character Recognition (OCR), Google Vision, Open CV, and Machine Learning (ML) algorithms to automatically detect content and send the content to the Redaction API and the Document Manipulation Engine 840 for redaction.

In an example, when processing a Driver License or other identification card, the Redaction Wizard 820 performs one or more of the following functions, among other functions: (1) automatically detects the location of certain textual information, such as first name, last name, address, date of birth, and driver license number (or other identification number); (2) automatically detect the photo on the license or card and automatically and permanently obscure it (e.g., by blurring it in a manner that cannot be reversed); (3) automatically recognize a signature on the license or card (e.g., using Google Vision) and automatically and permanently obscure it (e.g., by blurring it in a manner that cannot be reversed).

In another example, when processing a Bank Check, the Redaction Wizard 820 performs one or more of the following functions, among other functions: (1) automatically detects the Magnetic Ink Character Recognition (MICR) font which includes the account number and routing number; (2) automatically detect the address and other personal information located on the top left of the bank check; (3) automatically recognize handwritten objects (e.g., using Google Vision) and automatically and permanently obscure them (e.g., by blurring them in a manner that cannot be reversed).

In some embodiments, the Redaction API 810 effects the marking of identified information for redaction. The Redaction API 810 uses a Document Search Engine 860 for locating required text in documents, as indicated at 830. The Document Search Engine 860 is a library installed within the Redaction API 810 and utilizes an open-source viewer and has its own server functionality. The Document Search Engine 860 enables searching within the document, finds and highlights in the document the search terms, and marks the locations of the terms. The Document Search Engine 860 functionality is used to improve the user's search experience and easily highlight multiple search terms. Using the functionality, content (e.g., from a PDF file) can be highlighted and updated in real time. The functionality simplifies the process of viewing (e.g., of PDF files) because it can highlight keywords within text. The functionality can assign separate colors to different keywords, further enhancing and organizing search results. Using the functionality, users can seamlessly navigate between matching terms. The Document Search Engine 860 functionality is integrated by loading the viewer into the application in which the document (e.g., a PDF) will be rendered (e.g., placing the viewer code in the assets folder in the Angular application), configuring the highlighting functionality (installing its executable file in the system to create the environment for the functionality), and setting up a reverse proxy environment that will call the highlighting functionality.

The Redaction API 810 removes the marked information, permanently deletes it from the document file, and makes a redacted version of the document available. In some embodiments, the Redaction API 810 uses a Document Manipulation Engine 840 for tracking coordinates within documents, as indicated at 850. The Document Manipulation Engine 840 is a library installed within the Redaction API 810 and is a .NET library for manipulating PDF files. Content that is marked for redaction is provided to the Document Manipulation Engine 840, and the Document Manipulation Engine 840 removes and permanently deletes the content from the document, saves a redacted version of the document, and makes the redaction version of the document available for download.

In some embodiments, the Redaction API utilizes a Tracking Database 870 that tracks and records user behaviors with regard to the redaction of content from document and analyzes the resulting data to enhance the ability of the Redaction Wizard to automatically detect sensitive content in documents and suggest content for possible redaction.

Figure 15:
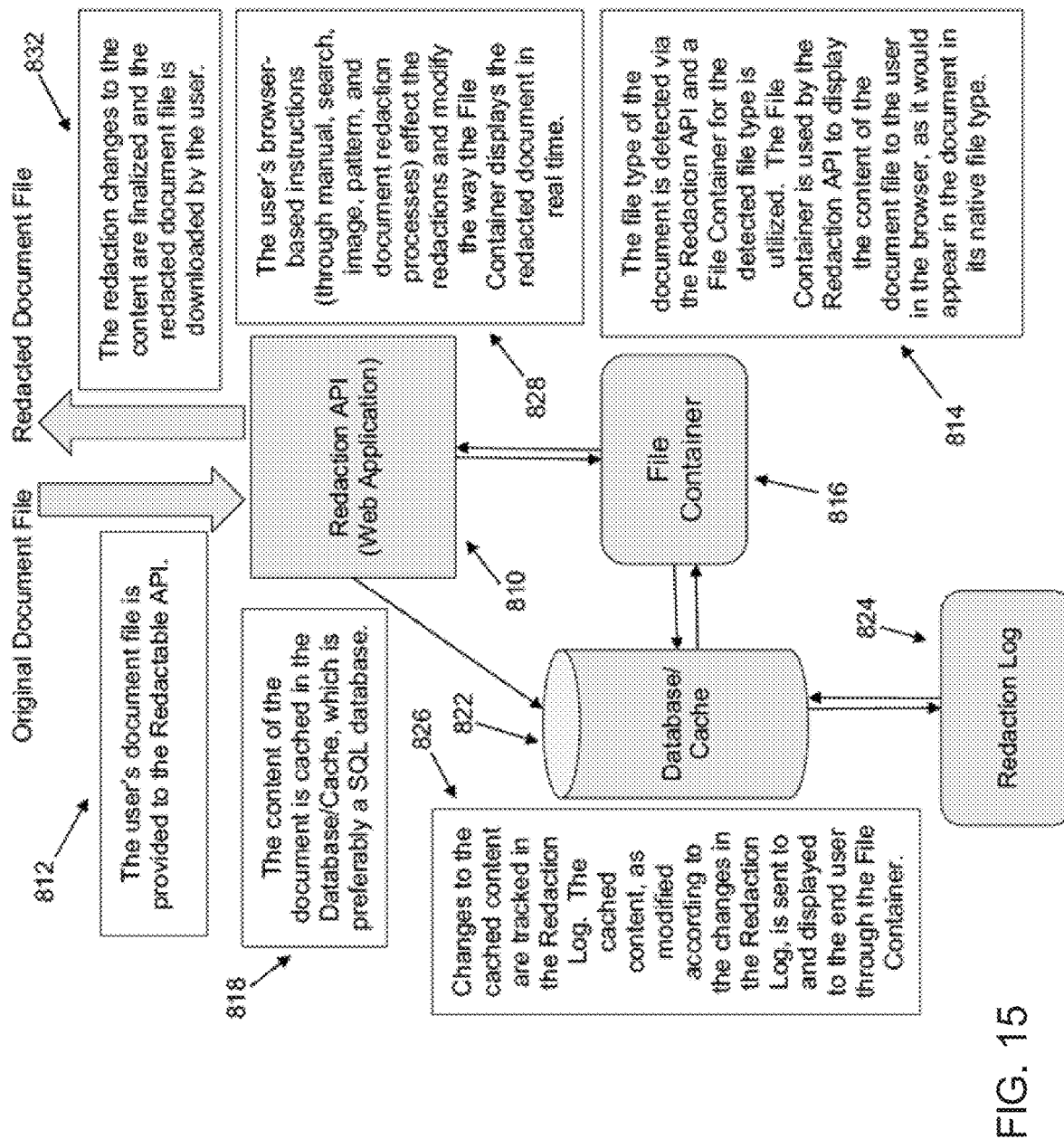
FIG. 15 illustrates an implementation of a process of maintaining a file type of a document in an example redaction system.

Referring now to FIG. 15, an implementation of an example process of maintaining a file type of a document, with the features illustrated by FIG. 14, is illustrated. Once a user provides a document to the Redaction API 810, as indicated at 812, the Redaction API detects the file type as indicated at 814. The Redaction API then associates the file type with a File Container 816 that is specific to the file type (e.g., each File Container handles all documents of a specific file type). Further, the Redaction API obtains content from the document in a manner specific to the file type (e.g., is programmed or otherwise trained to know, for that file type, where the content is and how to access it, and accordingly obtains the content from the document via such access) and, as indicated at 818, stores the content in a Database/Cache 822, which is an SQL database. The Redaction API further displays the cached content in the File Container so as to appear as the content would in the document, as indicated at

814. As the user provides instructions to effect redactions (through manual, search, image, pattern, and document redaction processes), as indicated at 828, the File Container updates the display of the document contents in real time. That is, the Redaction API tracks in a Redaction Log 824 desired changes to the cached content, as indicated at 826, and, further as indicated at 826, the Redaction API displays changed cached content (i.e., the cached content as modified according to the changes indicated in the Redaction Log) in the File Container so as to appear as the changed cached content would in the document. When the user has completed the redactions, the redaction changes to the content are finalized and the redaction document is made available for download by the user, as indicated at 832.

FIGS. 16-18 illustrate a functionality of finding text in a document (e.g., a PDF document). To make use of the highlighting functionality, its scripts are loaded into the Redaction API once the document viewer (e.g., PDF viewer) is loaded. Once the scripts and the viewer are loaded, the file is referenced from the API folder. Once a user clicks on a redaction action button (or other user interface element) on the file, or once a user selects the file, for the redaction process, in the files list, the file is downloaded from cloud storage. One copy of the file is saved in a static folder in the API so that the file can be referenced from the static folder available in the API to the viewer (e.g., see FIG. 16). Once a user searches any text, performs a manual redaction, or conducts any pattern search, a post request is made with the help of the proxy server to the highlighter functionality service running, which searches through the document and creates a temporary cache of the file and provides all the matches in a form of a JavaScript Object Notation (JSON) response. (e.g., see FIGS. 17-18).

FIGS. 19-21 illustrate undo action and redo action functionalities. Once the user performs any highlights, searches, redactions, or other actions, a document log with the state of the document is maintained and stored in the local storage of the browser, the match is set as permanent, and the user can undo the action (e.g., see FIG. 19). If the user selects Undo, the last action performed is checked. If the last action performed is a permanent action the system marks it as temporary and updates the document log with the appropriate state. If the last action performed is not a permanent action but is a temporary action, the system checks the nth position where the action is permanent, marks it as temporary, and updates the document log with the appropriate state (e.g., see FIG. 20). If the user selects Redo, the last action performed is checked. If the last action performed is a temporary action, the system marks it as permanent and updates the document log with the appropriate state. If the last action performed is not a temporary action but is a permanent action, the system checks the nth position where the action is temporary, marks it as temporary, and updates the document log with the appropriate state (e.g., see FIG. 21).

While not illustrated, the implementation further includes a redaction finalization functionality. If a user selects Finalize, a finalize redaction method is called. The document state log is checked once the method is called. If a specific match is found in the document state log and the match is a permanent match, a payload is created and is sent to the server-side code for final redaction. Once a payload is created, a post request is created to a controller available in the Redaction API. The Document Manipulation Engine handles the request for text replacement of the payload, serves the request, and permanently removes the content from the document.

While not illustrated, the implementation further includes a Bates numbering functionality. In an example, users can add Bates number to a document (e.g., an Adobe PDF document or a Microsoft Excel document). In another example, a user can add prefixes and suffixes to the Bates numbers and can also select the page number while adding the Bates number, where the page number is the sheet index (e.g., the starting sheet index). In yet another example, in the case of a Microsoft Excel document, three rows are added at the top of each sheet in the workbook file and the Bates numbers are added in the first cell of the sheets.

While not illustrated, the implementation further includes an auto-save, or automatic document saving, functionality. In an example, this functionality keeps track of user actions performed on a document, checks the document state log, and saves the document state log in a database. In another example, the logs for specific documents are updated at regular intervals (e.g., every 15 seconds). In yet another example, the user can close the Internet browser through which the user is accessing the redaction system, or cancel a redaction process, and when the user later resumes use of the redaction system and accesses the document, the document will be restored to its last modified state. For example, the redactions last performed by the user will be restored once the document is opened again in the redaction window. To accomplish this, once the document is opened in the redaction window, the document state logs are checked in the database. If the logs are available in the database for the specific document, a restore method is called.

Example Embodiments and Implements of the Disclosed Technology

Figure 22:
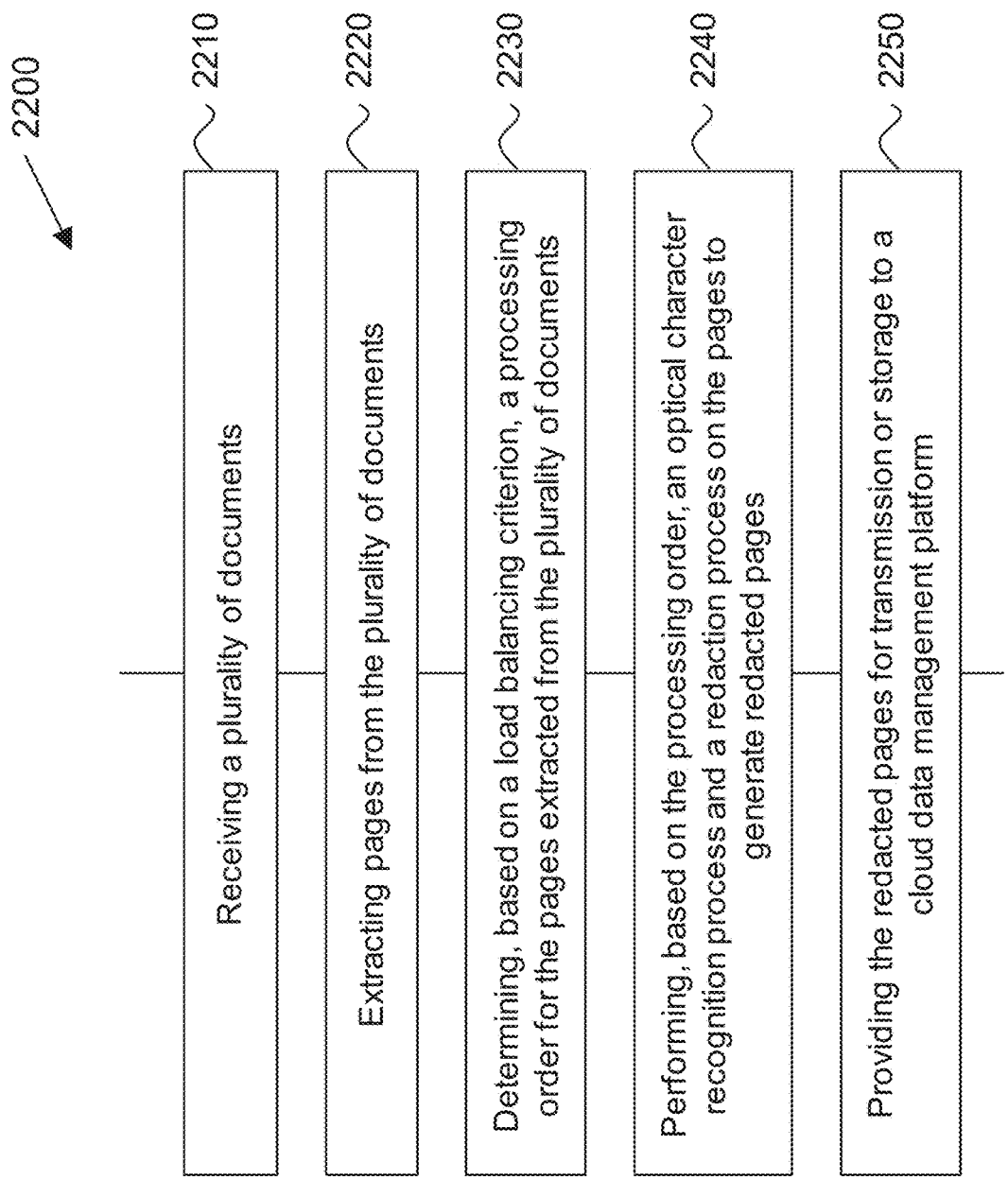
FIG. 22 illustrates a flowchart of an example method for redaction, in accordance with embodiments of the disclosed technology.

FIG. 22 is a flowchart of an example method 2200 for redacting documents. The method 2200 includes, at operation 2210, receiving a plurality of documents. In some embodiments, the received documents include pages that are not machine-readable, pages that have text, and pages that are already machine-readable (e.g., fillable PDF forms). The described embodiments are configured to recognize the pages that are not machine-readable or that include text that is not machine-readable, and perform the OCR process on only those pages.

The method 2200 includes, at operation 2220, extracting pages from the plurality of documents.

The method 2200 includes, at operation 2230, determining, based on a load balancing criterion, a processing order for the pages extracted from the plurality of documents. In some embodiments, the load balancing criterion specifies that a first set of pages and a second set of pages are processed concurrently (e.g., see FIG. 9). In an example, a first document of the plurality of documents comprises the first set of pages and a second document of the plurality of documents comprises the second set of pages. In another example, a first document of the plurality of documents comprises the first set of pages and the second set of pages, and wherein the second set of pages is subsequent to the first set of pages in the first document. In other embodiments, the load balancing criterion is based on minimizing a processing time for the optical character recognition process, a user-defined processing ordering, or a number of pages in the plurality of documents.

The method 2200 includes, at operation 2240, performing, based on the processing order, an optical character recognition process and a redaction process on the pages to generate redacted pages. In some embodiments, performing the optical character recognition process on each of the pages includes performing an image skewing correction on a page to generate a skew-corrected page, performing a denoising operation on the skew-corrected page to generate a skew-corrected denoised page, and detecting word boundaries in the skew-corrected denoised page. In other embodiments, the optical character recognition process comprises one or more of an image extraction operation, a layout analysis, an image preprocessing operation, an image line detection operation, an image line recognition operation, an image words detection operation, an image words recognition operation, or a file building operation. In yet other embodiments, the optical character recognition (OCR) process comprises a plurality of tasks, and wherein each of the plurality of tasks is implemented using a persistent queue (e.g., see FIG. 9). In yet other embodiments, the redaction process is based on a redaction methodology selected from the group consisting of a manual methodology, a search methodology, a pattern methodology, an image methodology, and a document methodology (e.g., see FIGS. 10-13).

The method 2200 includes, at operation 2250, providing the redacted pages for transmission or storage to a cloud data management platform. In some embodiments, the cloud data management platform (CDMP) is Google Cloud, Azure, or Amazon Web Service (AWS), and includes a cloud data storage service (CDSS).

Embodiments of the disclosed technology provides a system including a redaction container that includes a pre-processing module configured to receive a plurality of documents, and identify a subset of documents from the plurality of documents which satisfy one or more selection criterion, a message broker configured to extract pages from each of the subset of documents, a load balancer configured to determine a processing order for the pages extracted from the subset of documents, redaction software configured to perform, on each of the pages extracted from the subset of documents and based on the processing order, an optical character recognition process and a redaction process to generate redacted pages, and a redaction application programming interface configured to provide the redacted pages for transmission or storage to a cloud data management platform.

In some embodiments, the redaction container is configured for deployment to an enterprise client system (ECS), which is configured to use a plurality of cloud data management platforms (CDMPs) comprising the cloud data management platform.

In some embodiments, the redaction container further includes a redaction user interface configured to enable a user to operate, via the redaction application programming interface, the redaction software to configure the redaction process.

The disclosed technology provides, among others, the following technical solutions:

A1. A document redaction system, comprising a redaction container including a redaction software and a redaction application programming interface (R-API), wherein the redaction container is configured for deployment to an enterprise client system (ECS); the R-API is configured, upon said deployment, to determine which one of a plurality of cloud data management platforms (CDMPs) is used by the ECS; with a plurality of sets of client-side parameters, each set of client-side parameters being compatible with a respective one of the plurality of CDMPs; upon said CDMP use determination, to select as client-side parameters to the R-API one of the sets of client-side parameters, the selected set being compatible with the determined CDMP; upon said CDMP compatibility selection, to process incoming client data, of the ECS, corresponding to the selected set of client-side parameters, into software-side data corresponding to a set of software-side parameters compatible with the redaction software; and upon said client data processing, to provide the software-side data to the redaction software; and wherein the redaction software is configured: to use the software-side data received from the R-API to perform redaction, and is configured to provide resulting redaction data to the R-API; upon receipt of said redaction data, to process the redaction data into outgoing client data corresponding to the selected set of client-side parameters; and upon said redaction data processing, to provide the outgoing client data to the ECS.

A2. The document redaction system of solution A1, wherein the redaction container further includes a redaction user interface configured to enable a user to operate the redaction software, and the redaction software is configured to use the software-side data received from the R-API to perform redaction under direction of the user using the redaction user interface.

A3. The document redaction system of solution A2, further comprising a redaction web app, wherein the redaction user interface is configured to enable the user to operate the redaction software using the web app, and the redaction software is configured to use the software-side data received from the R-API to perform redaction under direction of the user using the web app.

A4. The document redaction system of solution A1, wherein the plurality of CDMPs includes two or more of the following: Google Cloud, Azure, and Amazon Web Service.

A5. The document redaction system of solution A1, wherein: the R-API includes a documents application programming interface (D-API); each CDMP includes a respective cloud data storage service (CDSS); the D-API is configured, upon deployment of the R-API, to determine which one of a plurality of the CDSSs is used by the ECS; with the plurality of sets of client-side parameters, and each set of client-side parameters is compatible with a respective one of the plurality of CDSSs; upon said CDSS use determination, to select as client-side parameters to the D-API one of the sets of client-side parameters, the selected set being compatible with the determined CDSS; upon said CDSS compatibility selection, to process the incoming client data into the software-side data; and upon said client data processing, to provide the software-side data to the redaction software; and wherein the redaction software is configured to use the software-side data to perform redaction, and is configured to provide the resulting redaction data to the D-API; upon receipt of said redaction data, to process the redaction data into the outgoing client data; and upon said redaction data processing, to provide the outgoing client data to the ECS.

A6. The document redaction system of solution A1, wherein: the R-API includes a profile application programming interface (P-API); the P-API is configured, upon deployment of the R-API, to determine which one of a plurality of identity management frameworks (IMFs) is used by the ECS; with the plurality of sets of client-side parameters, and each set of client-side parameters is compatible with a respective one of the plurality of IMFs; upon said IMF use determination, to select as client-side parameters to the P-API one of the sets of client-side parameters, the selected set being compatible with the determined IMF; upon said IMF compatibility selection, to process the incoming client data into the software-side data; and upon said client data processing, to provide the software-side data to the redaction software; wherein the redaction software is configured to use the software-side data to perform profile management, and is configured to provide resulting profile management data to the P-API; upon receipt of said profile management data, to process the profile management data into the outgoing client data; and upon said profile management data processing, to provide the outgoing client data to the ECS.

A7. A document redaction method comprising providing a redaction container including a redaction software and a redaction application programming interface (R-API), the method further comprising: deploying the redaction container to an enterprise client system (ECS); upon said deployment, determining, using the R-API, which one of a plurality of cloud data management platforms (CDMPs) is used by the ECS; with a plurality of sets of client-side parameters, each set of client-side parameters being compatible with a respective one of the plurality of CDMPs; upon said CDMP use determination, selecting, using the R-API, as client-side parameters to the R-API one of the sets of client-side parameters, the selected set being compatible with the determined CDMP; upon said CDMP compatibility selection, processing, using the R-API, incoming client data, of the ECS, corresponding to the selected set of client-side parameters, into software-side data corresponding to a set of software-side parameters compatible with the redaction software; and upon such client data processing, providing, using the R-API, the software-side data to the redaction software; and with the redaction software, using the software-side data received from the R-API to perform redaction, and providing resulting redaction data to the R-API; upon receipt of said redaction data, processing, using the R-API, the redaction data into outgoing client data corresponding to the selected set of client-side parameters; and upon said redaction data processing, providing, using the R-API, the outgoing client data to the ECS.

A8. The document redaction method of solution A7, wherein the redaction container further includes a redaction user interface, the method further comprising enabling, using the redaction user interface, a user to operate the redaction software; and using, using the redaction software, the software-side data received from the R-API to perform redaction under direction of the user using the redaction user interface.

A9. The document redaction method of solution A8, further comprising providing a redaction web app; enabling, using the redaction user interface, the user to operate the redaction software using the web app; and using, using the redaction software, the software-side data received from the R-API to perform redaction under direction of the user using the web app.

A10. The document redaction method of solution A7, wherein the plurality of CDMPs includes two or more of the following: Google Cloud, Azure, and Amazon Web Service.

A11. The document redaction method of solution A7, wherein: the R-API includes a documents application programming interface (D-API); each CDMP includes a respective cloud data storage service (CDSS); the method further comprising: upon deployment of the R-API, determining, using the D-API, which one of a plurality of the CDSSs is used by the ECS; the D-API being configured with the plurality of sets of client-side parameters, each set of client-side parameters being compatible with a respective one of the plurality of CDSSs; upon said CDSS use determination, selecting, using the D-API, as client-side parameters to the D-API one of the sets of client-side parameters, the selected set being compatible with the determined CDSS; upon said CDSS compatibility selection, processing, using the D-API, the incoming client data into the software-side data; and upon said client data processing, providing, using the D-API, the software-side data to the redaction software; and with the redaction software, using the software-side data to perform redaction, and providing the resulting redaction data to the D-API; upon receipt of said redaction data, processing, using the D-API, the redaction data into the outgoing client data; and upon said redaction data processing, providing, using the D-API, the outgoing client data to the ECS.

A12. The document redaction method of solution A7, wherein: the R-API includes a profile application programming interface (P-API); the method further comprising: upon deployment of the R-API, determining, using the P-API, which one of a plurality of identity management frameworks (IMFs) is used by the ECS; the P-API being configured with the plurality of sets of client-side parameters, each set of client-side parameters being compatible with a respective one of the plurality of IMFs; upon said IMF use determination, selecting, using the P-API, as client-side parameters to the P-API one of the sets of client-side parameters, the selected set being compatible with the determined IMF; upon said IMF compatibility selection, processing, using the P-API, the incoming client data into the software-side data; and upon said client data processing, providing, using the P-API, the software-side data to the redaction software; and with the redaction software, using the software-side data to perform profile management, and providing resulting profile management data to the P-API; upon receipt of said profile management data, processing, using the P-API, the profile management data into the outgoing client data; and upon said profile management data processing, providing, using the P-API, the outgoing client data to the ECS.

The disclosed technology further provides, among others, the following technical solutions:

B1. A document redaction system, comprising: a redaction container including: a pre-processing module configured to receive a plurality of documents, and identify a subset of documents from the plurality of documents which satisfy one or more selection criterion; a message broker configured to extract pages from each of the subset of documents; a load balancer configured to determine a processing order for the pages extracted from the subset of documents; redaction software configured to perform, on each of the pages extracted from the subset of documents and based on the processing order, an optical character recognition process and a redaction process to generate redacted pages; and a redaction application programming interface configured to provide the redacted pages for transmission or storage to a cloud data management platform.

B2. The document redaction system of solution B1, wherein the redaction container is configured for deployment to an enterprise client system (ECS).

B3. The document redaction system of solution B2, wherein the ECS is configured to use a plurality of cloud data management platforms (CDMPs) comprising the cloud data management platform.

B4. The document redaction system of solution B3, wherein the plurality of CDMPs includes two or more of: Google Cloud, Azure, and Amazon Web Service (AWS).

B5. The document redaction system of solution B3, wherein each CDMP includes a respective cloud data storage service (CDSS).

B6. The document redaction system of solution B1, wherein the redaction container further comprises: a redaction user interface configured to enable a user to operate, via the redaction application programming interface, the redaction software to configure the redaction process.

B7. The document redaction system of solution B1, wherein the processing order specifies that a first set of pages and a second set of pages are processed concurrently.

B8. The document redaction system of solution B7, wherein a first document of the plurality of documents comprises the first set of pages and a second document of the plurality of documents comprises the second set of pages.

B9. The document redaction system of solution B7, wherein a first document of the plurality of documents comprises the first set of pages and the second set of pages, and wherein the second set of pages is subsequent to the first set of pages in the first document.

B10. The document redaction system of solution B1, wherein the one or more selection criterion comprises a document including text or the document not being machine-readable.

B11. The document redaction system of solution B1, wherein performing the optical character recognition process on each of the pages comprises: performing an image skewing correction on a page to generate a skew-corrected page; performing a denoising operation on the skew-corrected page to generate a skew-corrected denoised page; and detecting word boundaries in the skew-corrected denoised page.

B12. A document redaction system, comprising: a processor; and a non-transitory memory, coupled to the processor, having code stored thereon, the code, when executed by the processor, causing the processor to: receive a plurality of documents; extract pages from the plurality of documents; determine, based on a load balancing criterion, a processing order for the pages extracted from the plurality of documents; perform, based on the processing order, an optical character recognition process and a redaction process on the pages to generate redacted pages; and provide the redacted pages for transmission or storage to a cloud data management platform.

B13. The document redaction system of solution B12, wherein the load balancing criterion specifies that pages from at least two of the plurality of documents are processed concurrently.

B14. The document redaction system of solution B12, wherein the optical character recognition process comprises a plurality of tasks, and wherein each of the plurality of tasks is implemented using a corresponding persistent queue of a plurality of persistent queues.

B15. The document redaction system of solution B14, wherein a number of the plurality of persistent queues is based on a number of threads supported by the processor.

B16. The document redaction system of solution B14, wherein the plurality of tasks comprises an image extraction operation, a layout analysis, an image preprocessing operation, an image line detection operation, an image line recognition operation, an image words detection operation, an image words recognition operation, or a file building operation.

B17. The document redaction system of solution B12, wherein the cloud data management platform (CDMP) is Google Cloud, Azure, or Amazon Web Service (AWS), and wherein the CDMP includes a cloud data storage service (CDSS).

B18. A document redaction method, comprising: receiving a plurality of documents; extracting pages from the plurality of documents; determining, based on a load balancing criterion, a processing order for the pages extracted from the plurality of documents; performing, based on the processing order, an optical character recognition process and a redaction process on the pages to generate redacted pages; and providing the redacted pages for transmission or storage to a cloud data management platform.

B19. The document redaction method of solution B18, wherein the load balancing criterion specifies that a first set of pages and a second set of pages are processed concurrently.

B20. The document redaction method of solution B18, wherein the optical character recognition (OCR) process comprises a plurality of tasks, and wherein each of the plurality of tasks is implemented using a persistent queue.

B21. The document redaction method of solution B18, wherein the load balancing criterion is based on minimizing a processing time for the optical character recognition process, a user-defined processing ordering, or a number of pages in the plurality of documents.

B22. The document redaction method of solution B18, wherein the redaction process is based on a redaction methodology selected from the group consisting of a manual methodology, a search methodology, a pattern methodology, an image methodology, and a document methodology.

B23. The document redaction method of solution B18, wherein the cloud data management platform (CDMP) is Google Cloud, Azure, or Amazon Web Service (AWS), and wherein the CDMP includes a cloud data storage service (CDSS).

B24. The document redaction method of solution B18, wherein the optical character recognition process comprises one or more of an image extraction operation, a layout analysis, an image preprocessing operation, an image line detection operation, an image line recognition operation, an image words detection operation, an image words recognition operation, or a file building operation.

B25. A document redaction method using the document redaction system in one or more of solutions B1 to B17.

B26. A system comprising a processor and a non-transitory memory having code stored thereon, the code, when executed by the processor, causing the processing to implement the document redaction method recited in one or more of solutions B18 to B24.

The disclosed technology further provides, among others, the following technical solutions:

C1. A system for redacting information from a document, the system comprising: a redaction methodology selector configured to select a desired redaction methodology for identifying information to be redacted, the desired methodology being selected from a selection set including at least one of manual methodology, search methodology, image methodology, pattern methodology and document methodology, an identified information marker configured to mark the identified information for redaction, a redaction implementer configured to perform redaction on the marked information, and a redacted document finalizer configured to save a redacted version of the document, in which the marked information has been replaced with desired placeholder information; wherein when the selected methodology is manual methodology, the information to be redacted is any content in the document, and the information is identified by a user navigating the document and selecting the content, wherein when the selected methodology is search methodology, the information to be redacted is one or more terms, and the information is identified by a user providing the terms, the system searching in the document for the terms, and the system finding in the document all instances of the terms, wherein when the selected methodology is image methodology, the information to be redacted is one or more images, and the information is identified by the system detecting in the document the images, wherein when the selected methodology is pattern methodology, the information to be redacted is content in a format, and the information is identified by a user identifying the format, the system searching in the document for any content in the format, and the system finding in the document all content in the format, wherein when the selected methodology is document methodology, the information to be redacted is sensitive content found in one or more documents of a type of document, and the information is identified by a selection of the type of document and the system detecting the sensitive content based on the type of document.

C2. The system of solution C1, wherein the redaction methodology selector is configured to accept, as the selection of the desired methodology, a user selection of the desired methodology.

C3. The system of solution C1, wherein the desired placeholder information includes Unicode text.

C4. The system of solution C1, wherein the desired placeholder information includes at least one of a set of one or more solid boxes, a set of one or more characters conveying information, a set of one or more characters spelling a phrase of one or more terms, a randomized set of one or more characters, a set of one or more space characters, blurred text, and blurred image.

C5. The system of solution C1, wherein the selected desired methodology is manual methodology, and the content includes one or more of a set of one or more characters, images, and pages.

C6. The system of solution C1, wherein the selected desired methodology is search methodology, and the terms are provided by the user by the user inputting one or more characters of a search phrase of one or more terms.

C7. The system of solution C1, wherein the selected desired methodology is image methodology, and the images are detected by one or more of hard programming, artificial intelligence, machine learning, and computer vision.

C8. The system of solution C1, wherein the selected desired methodology is pattern methodology, and the format is one or more of email address format, phone number format, name format, date format, currency format, Uniform Resource Locator format, Internet Protocol format, credit card number format, debit card number format, company name format, address format, zip code format, postal code format, location format, government-issued identification number format, company-issued identification number format, social security number format, and identification number format.

C9. The system of solution C1, wherein the selected desired methodology is document methodology, and the selection of the type of document is achieved by one or more of the user selecting the type of document and the system detecting the type of document.

C10. The system of solution C9, wherein the type of document is detected by one or more of hard programming, artificial intelligence, machine learning, and computer vision.

C11. The system of solution C9, wherein the sensitive content is information known to be in a least one of a known format and a known location in the type of document.

C12. The system of solution C11, wherein the known information is so known based on a pre-established association of one or more of the known format and the known location with the type of document.

C13. The system of solution C11, wherein the sensitive content is information is detected by, when the known information is information known to be in the known format in the type of document, the system searching in the document for any content in the known format, and the system finding in the document all content in the known format.

C14. The system of solution C11, wherein the sensitive content is information is detected by, when the known information is known to be in the known location in the type of document, the system searching in the document for any content in the known location, and the system finding in the document all content at the known location.

C15. The system of solution C1, wherein the document is provided by the user to the system in a file type, and the redacted version of the document is saved in the file type, and during identifying the information to be redacted, marking the identified information to be redacted, performing redaction on the marked information, and saving the redacted version of the document, the file type of the document is maintained unchanged from the file type.

C16. The system of solution C15, wherein the file type is one of an Adobe file type, a Microsoft file type, an Apple file type, and an open-source file type.

C17. The system of solution C16, wherein the file type is Portable Document Format.

C18. The system of solution C15, wherein the maintenance of the document unchanged from the file type is achieved by detecting the file type, associating the file type with a container specific to the file type, obtaining content from the document in a manner specific to the file type, storing the content in a cache, displaying the cached content in the container so as to appear as the content would in the document, tracking in a log desired changes to the cached content, and displaying changed cached content in the container so as to appear as the changed cached content would in the document, the changed cached content being the cached content as modified according to the changes indicated in the log.

C19. The system of solution C18, wherein the container is configured to accept the cached content as input and apply conditions to present the cached content as it would appear in the file type to which the container is specific.

C20. The system of solution C18, wherein tracking the desired changes in the log includes recording at least one of a location of the change and the change to be made.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of at least some of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements, and variations can be made based on what is described and illustrated in this patent document.

What is claimed is:

1. A document redaction system, comprising:
  a redaction container including:
    a pre-processing module configured to:
      receive a plurality of documents that includes a page that is not machine-readable, a page that has text, a page that is machine-readable, and a page that is a fillable Portable Document Format (PDF) form, and
      identify a subset of documents from the plurality of documents which satisfy one or more selection criterion;
    a message broker configured to extract pages from each of the subset of documents;
    a load balancer configured to determine a processing order for the pages extracted from the subset of documents, wherein the processing order specifies that a first set of pages and a second set of pages are processed concurrently, and wherein a first document of the plurality of documents comprises the first set of pages and a second document of the plurality of documents comprises the second set of pages;

redaction software configured to perform, on each of the pages extracted from the subset of documents and based on the processing order, an optical character recognition process and a redaction process to generate redacted pages, wherein performing the optical character recognition process on a particular page comprises:

performing an image skewing correction on the particular page to generate a skew-corrected page, performing a denoising operation on the skew-corrected page to generate a skew-corrected denoised page, and detecting word boundaries in the skew-corrected denoised page; and a redaction application programming interface (API) configured to provide the redacted pages for transmission or storage to a cloud data management platform, wherein the pre-processing module, the message broker, the load balancer, the redaction software, and the redaction API are performed by at least one processor coupled to at least one non-transitory memory.

2. The document redaction system of claim 1, wherein the redaction container is configured for deployment to an enterprise client system (ECS).

3. The document redaction system of claim 2, wherein the ECS is configured to use a plurality of cloud data management platforms (CDMPs) comprising the cloud data management platform.

4. The document redaction system of claim 3, wherein the plurality of CDMPs includes two or more of: Google Cloud, Azure, and Amazon Web Service (AWS).

5. The document redaction system of claim 3, wherein each CDMP includes a respective cloud data storage service (CDSS).

6. The document redaction system of claim 1, wherein the redaction container further comprises:

a redaction user interface configured to enable a user to operate, via the redaction application programming interface, the redaction software to configure the redaction process.

7. A document redaction method, comprising:

receiving a plurality of documents that includes a page that is not machine-readable, a page that has text, a page that is machine-readable, and a page that is a fillable Portable Document Format (PDF) form;

extracting pages from the plurality of documents;

determining, based on a load balancing criterion, a processing order for the pages extracted from the plurality of documents, wherein the processing order specifies that a first set of pages and a second set of pages are processed concurrently, and wherein a first document of the plurality of documents comprises the first set of pages and a second document of the plurality of documents comprises the second set of pages;

performing, based on the processing order, an optical character recognition process and a redaction process on the pages to generate redacted pages; and providing the redacted pages for transmission or storage to a cloud data management platform, wherein performing the optical character recognition process on a particular page comprises:

performing an image skewing correction on the particular page to generate a skew-corrected page, performing a denoising operation on the skew-corrected page to generate a skew-corrected denoised page, and detecting word boundaries in the skew-corrected denoised page.

8. The document redaction method of claim 7, wherein the load balancing criterion is based on minimizing a processing time for the optical character recognition process, a user-defined processing ordering, or a number of pages in the plurality of documents.

9. The document redaction method of claim 7, wherein the redaction process is based on a redaction methodology selected from the group consisting of a manual methodology, a search methodology, a pattern methodology, an image methodology, and a document methodology.

10. The document redaction method of claim 7, wherein the optical character recognition process comprises one or more of an image extraction operation, a layout analysis, an image preprocessing operation, an image line detection operation, an image line recognition operation, an image words detection operation, an image words recognition operation, or a file building operation.

11. A document redaction system, comprising:

a processor; and a non-transitory memory, coupled to the processor, having code stored thereon, the code, when executed by the processor, causing the processor to:

receive a plurality of documents that includes a page that is not machine-readable, a page that has text, a page that is machine-readable, and a page that is a fillable Portable Document Format (PDF) form;

extract pages from the plurality of documents;

determine, based on a load balancing criterion, a processing order for the pages extracted from the plurality of documents, wherein the processing order specifies that a first set of pages and a second set of pages are processed concurrently, and wherein a first document of the plurality of documents comprises the first set of pages and a second document of the plurality of documents comprises the second set of pages;

perform, based on the processing order, an optical character recognition process and a redaction process on the pages to generate redacted pages; and provide the redacted pages for transmission or storage to a cloud data management platform, wherein performing the optical character recognition process on a particular page comprises:

performing an image skewing correction on the particular page to generate a skew-corrected page, performing a denoising operation on the skew-corrected page to generate a skew-corrected denoised page, and detecting word boundaries in the skew-corrected denoised page.

12. The document redaction system of claim 11, wherein the optical character recognition process comprises a plurality of tasks, and wherein each of the plurality of tasks is implemented using a corresponding persistent queue of a plurality of persistent queues.

13. The document redaction system of claim 11, wherein a number of the plurality of persistent queues is based on a number of threads supported by the processor.

14. The document redaction system of claim 7, wherein the plurality of tasks comprise an image extraction operation, a layout analysis, an image preprocessing operation, an image line detection operation, an image line recognition operation, an image words detection operation, an image words recognition operation, or a file building operation.

15. The document redaction system of claim 12, wherein the cloud data management platform (CDMP) is Google Cloud, Azure, or Amazon Web Service (AWS), and wherein the CDMP includes a cloud data storage service (CDSS).

* * * * *